(12) United States Patent
Kang et al.

(10) Patent No.: US 12,223,112 B2
(45) Date of Patent: Feb. 11, 2025

(54) DISPLAY APPARATUS

(71) Applicant: LG Display Co., Ltd., Seoul (KR)

(72) Inventors: Saewon Kang, Paju-si (KR); SeungRyull Park, Paju-si (KR); YuSeon Kho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/381,922

(22) Filed: Oct. 19, 2023

(65) Prior Publication Data

US 2024/0176423 A1 May 30, 2024

(30) Foreign Application Priority Data

Nov. 30, 2022 (KR) .......................... 10-2022-0164970

(51) Int. Cl.
| | | |
|---|---|---|
| *G06F 3/01* | (2006.01) | |
| *G06F 3/041* | (2006.01) | |
| *G06F 3/044* | (2006.01) | |
| *H04R 1/02* | (2006.01) | |
| *H04R 17/00* | (2006.01) | |

(52) U.S. Cl.
CPC ............ *G06F 3/016* (2013.01); *G06F 3/0416* (2013.01); *G06F 3/0443* (2019.05); *H04R 1/028* (2013.01); *H04R 17/00* (2013.01); *G06F 2203/04105* (2013.01); *H04R 2499/15* (2013.01)

(58) Field of Classification Search
CPC ................... G06F 3/016; G06F 2203/013–015
See application file for complete search history.

(56) References Cited

U.S. PATENT DOCUMENTS

| | | | | |
|---|---|---|---|---|
| 8,704,776 | B2* | 4/2014 | Kim .................. | G06F 3/016 |
| | | | | 345/173 |
| 8,723,810 | B2* | 5/2014 | Kim .................. | G06F 3/016 |
| | | | | 345/173 |
| 9,501,147 | B2* | 11/2016 | Heubel ............... | G06F 3/017 |
| 9,639,158 | B2* | 5/2017 | Levesque ............ | G06F 3/0481 |
| 11,137,900 | B2* | 10/2021 | Hudin ................ | G06F 3/016 |
| 2007/0236450 | A1* | 10/2007 | Colgate .............. | G06F 3/041 |
| | | | | 345/156 |

(Continued)

FOREIGN PATENT DOCUMENTS

| | | |
|---|---|---|
| KR | 10-2014-0017039 A | 2/2014 |
| KR | 10-2015-0060575 A | 6/2015 |
| WO | WO 2022/090090 A1 | 5/2022 |

OTHER PUBLICATIONS

Maeno et al., Tactile Display of Surface Texture by use of Amplitude Modulation of Ultrasonic Vibration, IEEE Ultrasonic Symposium, 2006, pp. 62-65 (Year: 2006).*

(Continued)

*Primary Examiner* — Patrick F Marinelli
(74) *Attorney, Agent, or Firm* — Birch, Stewart, Kolasch & Birch, LLP

(57) ABSTRACT

A display apparatus is provided, and the display apparatus includes a display member having a plurality of pixels configured to display an image, and a vibration apparatus configured to vibrate the display member based on a haptic driving signal. The haptic driving signal includes a texture signal and an ultrasonic signal. Accordingly, the display apparatus can provide a user with a tactile feedback including a virtual texture.

29 Claims, 11 Drawing Sheets

(56) References Cited

U.S. PATENT DOCUMENTS

| | | | |
|---|---|---|---|
| 2014/0139451 A1* | 5/2014 | Levesque | G06F 3/016 345/173 |
| 2015/0145657 A1* | 5/2015 | Levesque | G06F 3/016 340/407.2 |
| 2019/0116406 A1 | 4/2019 | Ahn et al. | |
| 2020/0050356 A1* | 2/2020 | Hudin | G06F 3/016 |
| 2021/0165491 A1* | 6/2021 | Sun | G06T 7/40 |
| 2022/0050526 A1* | 2/2022 | Rupin | H10N 30/204 |
| 2024/0046691 A1* | 2/2024 | Lu | B06B 1/0622 |
| 2024/0176423 A1* | 5/2024 | Kang | G06F 3/0443 |
| 2024/0256045 A1* | 8/2024 | Moon | G06F 3/041 |
| 2024/0264676 A1* | 8/2024 | Sohn | G06F 3/0412 |

OTHER PUBLICATIONS

Watanabe, T. et al., "A Method for Controlling Tactile Sensation of Surface Roughness Using Ultrasonic Vibration," IEEE International Conference on Robotics and Automation, 0-7803-1965-6/95, 1995, pp. 1134-1139 (Year: 1995).*

Landelle et al., "The impact of movement sonification on haptic perception changes with aging" Scientific Reports, vol. 11, No. 1, Mar. 4, 2021, pp. 1-13.

Sappati et al., "Piezoelectric Polymer and Paper Substrates: A Review," Sensors, vol. 18, No. 11, Oct. 24, 2018, pp. 1-30.

* cited by examiner

DISPLAY APPARATUS

CROSS-REFERENCE TO RELATED APPLICATIONS

This application claims priority to Korean Patent Application No. 10-2022-0164970 filed in the Republic of Korea on Nov. 30, 2022, the entire contents of which are hereby expressly incorporated by reference into the present application.

BACKGROUND

Field

The present disclosure relates to a display apparatus.

Description of the Related Art

As our information-oriented society advances, the needs for display apparatuses displaying an image are variously increasing.

Electronic devices using a display apparatus as a display screen provide a user interface of a touch screen type, for convenience of a user input. Display apparatuses capable of touch interface processing are advancing to provide more various functions.

Further, display apparatuses including a touch panel or display apparatuses with touch screen integrated therein, which are capable of touch sensing based on a touch pen (or a stylus pen) as well as finger touch sensing based on a finger, are being widely used.

Recently, haptic technology, which provides a haptic feedback to a user when the user touches a screen of a display apparatus, is being developed. Display apparatuses to which the haptic technology is applied generate a stimulating force for stimulating a tangoreceptor of a human body, and stimulate a tactile sense of a user by using the stimulating force, thereby enabling the user to recognize a touch and a texture of the touch.

SUMMARY OF THE DISCLOSURE

The inventors of the present disclosure have performed various research and experiments for providing a user with sufficient user experiences such as a tactile feedback or the like when there is a user's touch. Based on the various research and experiments, the inventors have invented a new and improved display apparatus for providing a user with a tactile feedback including a virtual texture.

One or more aspects of the present disclosure are directed to providing a display apparatus which can provide a user with a tactile feedback including a virtual texture.

One or more aspects of the present disclosure are directed to providing a display apparatus which can provide a user with a tactile feedback including a touch texture desired by the user.

One or more aspects of the present disclosure are directed to providing a display apparatus which can simultaneously provide a user with a virtual texture and a sound corresponding to the virtual texture.

Additional features, advantages, and aspects of the present disclosure are set forth in the present disclosure and will also be apparent from the present disclosure or can be learned by practice of the inventive concepts provided herein. Other features, advantages, and aspects of the present disclosure can be realized and attained by the structure particularly pointed out in the present disclosure, or derivable therefrom, and claims hereof as well as the appended drawings.

To achieve these and other advantages and aspects of the present disclosure, as embodied and broadly described herein, in one or more aspects, a display apparatus can comprise a display member including a plurality of pixels configured to display an image, and a vibration apparatus configured to vibrate the display member based on a haptic driving signal. The haptic driving signal can comprise a texture signal and an ultrasonic signal.

A display apparatus according to one or more embodiments of the present disclosure can provide a user with a tactile feedback including a virtual texture.

A display apparatus according to one or more embodiments of the present disclosure can provide a user with a tactile feedback including a touch texture desired by the user.

A display apparatus according to one or more embodiments of the present disclosure can simultaneously provide a user with a virtual texture and a sound corresponding to the virtual texture.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, are incorporated in and constitute a part of this disclosure, illustrate aspects and embodiments of the disclosure and together with the description serve to explain principles of the disclosure.

Figure 1:
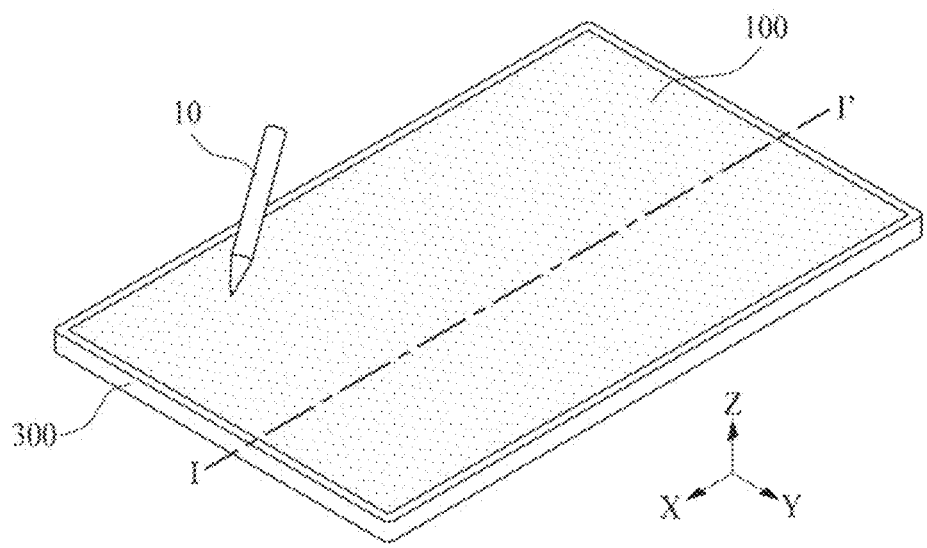
FIG. 1 is a perspective view illustrating a display apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTION OF THE EMBODIMENTS

Reference is now made in detail to embodiments of the present disclosure, examples of which can be illustrated in the accompanying drawings. In the following description, when a detailed description of well-known methods, functions, structures or configurations can unnecessarily obscure aspects of the present disclosure, the detailed description thereof may have been omitted for brevity. Further, repetitive descriptions can be omitted for brevity. The progression of processing steps and/or operations described is a non-limiting example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the embodiments described with reference to the accompanying drawings. The present disclosure may, however, be embodied in different forms and should not be construed as limited to the embodiments set forth herein. Rather, these embodiments are examples and are provided so that this disclosure can be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "comprise," "have," "include," "contain," "constitute," "made of" "formed of," or the like is used with respect to one or more elements, one or more other elements can be added unless a term such as "only" or the like is used. The terms used in the present disclosure are merely used in order to describe example embodiments, and are not intended to limit the scope of the present disclosure. The terms of a singular form can include plural forms unless the context clearly indicates otherwise.

The word "exemplary" is used to mean serving as an example or illustration, unless otherwise specified. Embodiments are example embodiments. Aspects are example aspects. "Embodiments," "examples," "aspects," and the like should not be construed to be preferred or advantageous over other implementations. An embodiment, an example, an example embodiment, an aspect, or the like may refer to one or more embodiments, one or more examples, one or more example embodiments, one or more aspects, or the like, unless stated otherwise. Further, the term "may" encompasses all the meanings of the term "can."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship where the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used. For example, when a structure is described as being positioned "on," "on a top of," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential can be included and thus one or more other events may occur therebetween, unless a more limiting term, such as "just," "immediate(ly)," or "direct(ly)," is used.

It is understood that, although the terms "first," "second," or the like can be used herein to describe various elements (e.g., layers, films, regions, components, sections, or the like), these elements should not be limited by these terms, for example, to any particular order, sequence, precedence, or number of elements. These terms are used only to distinguish one element from another. For example, a first element could be a second element, and, similarly, a second element could be a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other, and can be meant as lines or directions having wider directivities within the range within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements, "and/or" a third element should be understood to encompass one of the first, second, and third elements, or any or all combinations of the first, second and third elements. By way of example, A, B and/or C may refer to only A; only B; only C; any of A, B, and C (e.g., A, B, or C); some combination of A, B, and C (e.g., A and B; A and C; or B and C); or all of A, B, and C. Furthermore, an expression "A/B" can be understood as A and/or B. For example, an expression "A/B" can refer to only A; only B; A or B; or A and B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" can be used interchangeably simply for convenience unless stated otherwise. For example, an expression "different from each other" can be understood as being different from one another. In another example, an expression "different from one another" can be understood as being different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various embodiments of the present disclosure can be partially or entirety coupled to or combined with each other, may be technically associated with each other, and can be variously operated, linked, or driven together in various ways. Embodiments of the present disclosure can be implemented or carried out independently of each other, or can be implemented or carried out together in a co-dependent or related relationship. In one or more aspects, the components of each apparatus according to various embodiments of the present disclosure are operatively coupled and configured.

Unless otherwise defined, the terms (including technical and scientific terms) used herein have the same meaning as commonly understood by one of ordinary skill in the art to which example embodiments belong. It is further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example embodiments.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the following description, various example embodiments of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings can be different from an actual scale, dimension, size, and thickness. Thus, embodiments of the present disclosure are not limited to a scale, dimension, size, or thickness illustrated in the drawings.

Figure 2:
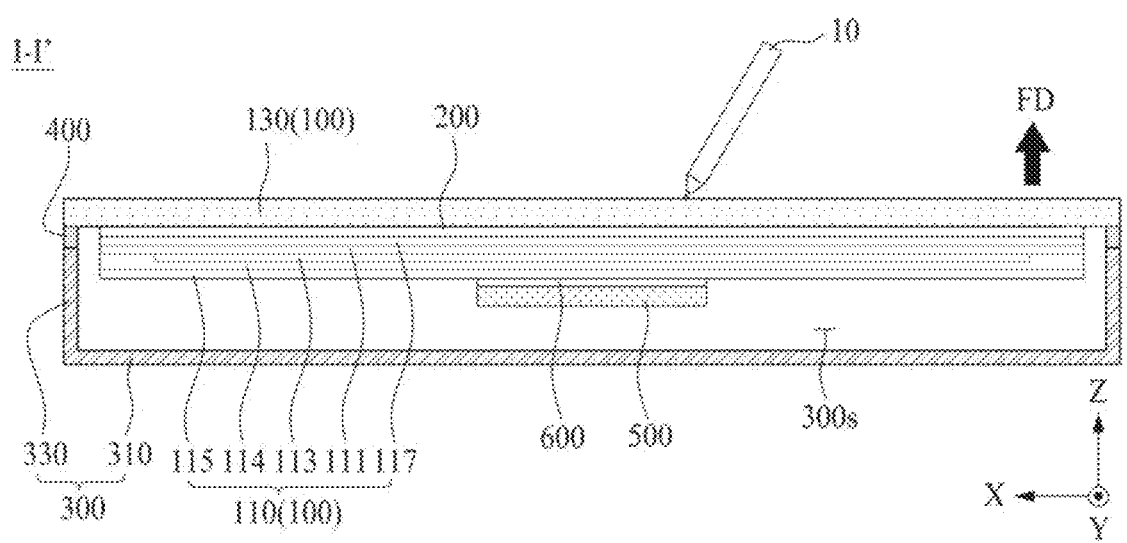
FIG. 2 is a cross-sectional view of a display apparatus taken along line I-I' in FIG. 1 according to an embodiment of the present disclosure.

FIG. 1 is a perspective view illustrating a display apparatus according to an embodiment of the present disclosure. FIG. 2 is a cross-sectional view of a display apparatus taken along line I-I' in FIG. 1.

With reference to FIGS. 1 and 2, a display apparatus according to an embodiment (or a first embodiment) of the present disclosure can be configured to sense one or more of a finger touch based on a finger and a touch based on a touch pen (or a stylus pen). For example, the display apparatus according to an embodiment of the present disclosure can be a display apparatus added a touch panel or a display apparatus with touch screen integrated therein. For example, the display apparatus according to an embodiment of the present disclosure can be used as a display apparatus for mobile electronic apparatuses such as mobile phones, smartphones, smart watches, tablet personal computers (PCs), or watch phones, smart televisions, electronic whiteboards, bidirectional information transfer transparent displays, bidirectional digital signage, or refrigerators.

The display apparatus according to an embodiment of the present disclosure can include a display member 100, a touch panel 200, a supporting member 300, and a vibration apparatus 500.

The display member 100 can be configured to display an image and can be configured to output one or more of a sound and a haptic feedback (or a haptic vibration), based on a vibration of the vibration apparatus 500. The display member 100 can be used as a vibration plate of the vibration apparatus 500.

The display member 100 can include a display panel 110 which displays an image. The image can include an electronic image, a digital image, a still image, or a video image or the like. For example, the display panel 110 can be an organic light emitting display panel including a plurality of pixels which implement a black/white or color image, but a type of display panel is not limited thereto. For instance, the display panel 110 can include a liquid crystal display panel, an electrophoresis display panel, a micro light emitting diode display panel, an electro-wetting display panel, or a quantum dot light emitting display panel or the like. Hereinafter, an example where the display panel 110 is an organic light emitting display panel will be described, but embodiments of the present disclosure are not limited thereto.

The display panel 110 according to an embodiment of the present disclosure can include a base substrate 111, a display part 113, and a plate member 115.

The base substrate 111 can be configured as one or more of a glass material and a plastic material. For example, the base substrate 111 can be configured as a polyimide material. For example, the base substrate 111 can include a stack structure of a glass layer and a plastic layer. For example, the base substrate 111 can be a first substrate, a display substrate, a front substrate, a front member, or an external substrate, but embodiments of the present disclosure are not limited thereto.

The display part 113 can be disposed at a first surface of the base substrate 111 and configured to display an image.

The display part 113 can include a plurality of pixels configured to display an image based on signals supplied to signal lines disposed at the first surface of the base substrate 111. For example, the display part 113 can include a pixel array part which is disposed at a pixel area provided by a plurality of gate lines and/or a plurality of data lines. The pixel array part can include a plurality of pixels configured to display an image based on signals supplied to signal lines. The signal lines can include a gate line, a data line, and a pixel driving power line or the like, but embodiments of the present disclosure are not limited thereto.

Each of the plurality of pixels can be configured to display an image in a type such as a bottom emission type, but embodiments of the present disclosure are not limited thereto. For example, each of the plurality of pixels can be configured to display an image in a type such as a top emission type. Light generated from the pixels based on the bottom emission type can pass through the base substrate 111 and can be emitted (or output) in a forward direction FD of the display panel 110. Light generated from the pixels based on the top emission type can pass through the plate member 115 and can be emitted (or output) in a forward direction FD of the display panel 110.

Each of the plurality of pixels can include a pixel circuit layer including a driving thin film transistor (TFT) provided at a pixel area comprising a plurality of gate lines and/or a plurality of data lines, an anode electrode electrically connected to the driving TFT, a light emitting device formed on the anode electrode, and a cathode electrode electrically connected to the light emitting device.

The light emitting device according to an embodiment of the present disclosure can include an organic light emitting device layer formed on the anode electrode. The organic light emitting device layer can be implemented so that each pixel emits light of the same color (for example, white light or one of red light, green light, and blue light), or can be implemented so that pixels emit lights of different colors (for example, one of red light, green light, and blue light).

The display panel 110 according to an embodiment of the present disclosure can further include a scan driving circuit (or a gate driving circuit) provided in a non-display part at a periphery of the display part 113 of the base substrate 111. The scan driving circuit can generate the scan pulse, based on a gate control signal, and can supply the scan pulse to the gate line. The scan driving circuit according to an embodiment of the present disclosure can be configured with a shift register including a transistor provided at the non-display part on the base substrate 111. This transistor can be provided as part of the same TFT process which is used to provide the TFTs of the pixels.

The plate member 115 can be configured to cover the display part 113. The plate member 115 can be attached on the display part 113 by an adhesive member 114. The adhesive member 114 can be disposed on the base substrate 111 to surround, or partially surround, the display part 113. For example, the adhesive member 114 can be disposed between the base substrate 111 and the plate member 115 to surround, or partially surround, the display part 113. The plate member 115 can protect the display part 113 or the display panel 110 from an external impact and can prevent external water or moisture from penetrating into the light emitting device or the organic light emitting device layer. The plate member 115 can compensate for the stiffness of the display panel 110. For example, the plate member 115 can be a plate, a metal plate, a heat dissipation member, a heat dissipation plate, a heat dissipation substrate, an encapsulation substrate, an encapsulation plate, a stiff plate, a second substrate, a rear substrate, a rear member, a rear plate, an internal substrate, or an internal plate, but embodiments of the present disclosure are not limited thereto.

The plate member 115 according to an embodiment of the present disclosure can be or include a metal material. For example, the plate member 115 can include one or more materials of an alloy of iron and nickel, stainless steel, aluminum (Al), a magnesium (Mg), a Mg alloy, a magnesium-lithium (Mg—Li) alloy, and an Al alloy, but embodiments of the present disclosure are not limited thereto.

The display panel 110 according to an embodiment of the present disclosure can further include an encapsulation layer. The encapsulation layer can be disposed between the display part 113 and the adhesive member 114 to directly surround, or partially surround, the display part 113. The encapsulation layer can be configured to prevent external water or moisture from penetrating into the light emitting device or the organic light emitting device layer. The encapsulation layer can be or comprise an inorganic material layer or an organic material layer, or can be or comprise a multi-layer structure where an inorganic material layer and an organic material layer are alternately stacked. For example, the encapsulation layer can be omitted based on a structure of the display panel 110.

The display panel 110 according to an embodiment of the present disclosure can further include a functional film 117.

The functional film 117 can be disposed at a second surface (or an outer surface or a light extraction surface), which is opposite to a first surface of the base substrate 111. The functional film 117 according to an embodiment of the present disclosure can include one or more of an anti-reflection layer (or an anti-reflection film), a barrier layer (or a barrier film), and a light path control layer (or a light path control film), but embodiments of the present disclosure are not limited thereto.

The anti-reflection layer can be a polarization layer (or a polarization film) for blocking light which is reflected by the TFT and/or the signal lines at the display portion 113 and again travels to the outside. For example, the anti-reflection layer can include a circular polarization layer (or a circular polarization film). The barrier layer can include a polymer material or a material which is low in a water transmittance rate, and thus, can prevent the penetration of water or oxygen from the outside. The light path control layer can include a stacked structure where a high refraction layer and a low refraction layer are alternately stacked and can change a path of light incident from each pixel P to minimize a color shift based on a viewing angle.

The display member 100 according to an embodiment of the present disclosure can further include a front member 130 connected to the display panel 110. The front member 130 can be a foremost structure of the display apparatus and can protect a screen of the display panel 110. The front member 130 can be disposed at a front surface of the display panel 110. For example, the front member 130 can cover a front surface of the display panel 110, and thus, can protect the display panel 110 from an external impact. The front member 130 according to an embodiment of the present disclosure can include a transparent plastic material, a glass material, or a reinforced glass material, but embodiments of the present disclosure are not limited thereto. For example, the front member 130 can include a front structure, a front window, a cover window, a glass window, a cover screen, a screen cover, a window glass or the like, but embodiments of the present disclosure are not limited thereto.

The touch panel 200 can be configured to sense a user's touch applied to the display member 100. For example, the touch panel 200 can be configured to sense a user's touch based on a touch pen 10 or a finger. However, the user's touch can be based on any other object or item that can provide a touch or a contact, a proximity or indirect contact, etc.

The touch panel 200 according to an embodiment of the present disclosure can be configured to be connected to the display panel 110 of the display member 100. For example, the touch panel 200 can be interposed or disposed between the display panel 110 of the display member 100 and the front member 130. For example, a first surface (or a front surface) of the touch panel 200 can be connected to or attached on a rear surface of the front member 130 by a transparent adhesive member. A second surface (or rear surface) of the touch panel 200 can be connected to or attached on the front surface of the display panel 110 by a transparent adhesive member. For example, the second surface of the touch panel 200 can be connected to or attached on the base substrate 111 of the display panel 110, but embodiments of the present disclosure are not limited thereto. For example, when the display panel 110 further includes the functional film 117, the second surface of the touch panel 200 can be connected to or attached on the functional film 117 of the display panel 110.

The touch panel 200 according to another embodiment of the present disclosure can be embedded in the display panel 110. For example, the touch panel 200 can be interposed between the base substrate 111 and the functional film 117.

The touch panel 200 according to another embodiment of the present disclosure can be configured between the display part 113 of the display panel 110 and the plate member 115, but embodiments of the present disclosure are not limited thereto. For example, the touch panel 200 can be disposed on the encapsulation layer of the display panel 110, or can be disposed in the pixel array part or a rear surface of the pixel array part. In this case, the touch panel 200 can be an in-cell type touch panel, a touch electrode layer, or a touch sensor layer, but embodiments of the present disclosure are not limited thereto.

The touch panel 200 according to an embodiment of the present disclosure can include a touch electrode layer including a touch electrode for sensing a finger touch or a pen touch of a user applied to the display member 100. The touch electrode layer can be configured to sense a capacitance variation of the touch electrode based on the user's touch. For example, the touch electrode layer can include an electrode structure corresponding to a mutual-capacitance type configured so that a plurality of touch driving electrodes and a plurality of touch sensing electrodes cross each other or a self-capacitance type configured with only a plurality of touch sensing electrodes.

The supporting member 300 can be provided (or configured) to cover or surround a rear surface of the display member 100. The supporting member 300 can include an internal space 300s which covers the rear surface of the display member 100. For example, the supporting member 300 can have a box shape where one side (or one portion or an upper side or an upper portion) of the internal space 300s is opened.

The supporting member 300 according to an embodiment of the present disclosure can include a first supporting part 310 and a second supporting part 330.

The first supporting part 310 can be provided (or configured) to cover the rear surface of the display member 100. For example, the first supporting part 310 can be a bottom part, a bottom plate, a supporting plate, a housing plate, a housing bottom part or the like, but embodiments of the present disclosure are not limited thereto.

The second supporting part 330 can be connected to an edge portion (or a periphery portion) of the first supporting part 310. For example, the second supporting part 330 can include a structure where the edge portion of the first supporting part 310 is bent. For example, the second supporting part 330 can be a lateral part, a sidewall, a supporting sidewall, a housing lateral surface, or a housing sidewall, but embodiments of the present disclosure are not limited thereto.

The second supporting part 330 can be integrated into the first supporting part 310. For example, the first supporting part 310 and the second supporting part 330 can be provided (or integrated) as one body, and thus, the internal space 300s surrounded by the second supporting part 330 can be provided on the first supporting part 310. Accordingly, the supporting member 300 can include a box shape (or a 'U-shape') where one side (or one portion or an upper side or an upper portion) is opened by the first supporting part 310 and the second supporting part 330. In other words, the supporting member 300 cannot comprise a part or structure opposite to the first supporting part 310. Instead, the front member 130 and/or the display panel 110 can be disposed opposite to the first supporting part 310.

The display apparatus according to an embodiment of the present disclosure can further include a coupling member 400 between the display member 100 and the supporting member 300.

The supporting member 300 can be coupled to or connected to the display member 100 by the coupling member 400. The supporting member 300 can be coupled to or connected to the display member 100 by the coupling member 400. The supporting member 300 can be connected or coupled to a rear edge portion (or a rear periphery portion) of the display member 100 by the coupling member 400. For example, the supporting member 300 can be connected or coupled to a rear edge portion (or a rear periphery portion) of the front member 130 by the coupling member 400, but embodiments of the present disclosure are not limited thereto.

According to an embodiment of the present disclosure, the front member 130 of the display member 100 can be omitted. In this case, the supporting member 300 can be provided (or configured) to surround a lateral surface of the display panel 110. For example, the second supporting part 330 of the supporting member 300 can be provided (or configured) to surround the lateral surface of the display panel 110. When the front member 130 is omitted, the coupling member 400 can be provided between the display panel 110 and the supporting member 300. For example, the coupling member 400 can be disposed between a rear edge portion (or a rear periphery portion) of the display panel 110 and a front edge portion (or a first periphery portion) of the first supporting part 310.

The vibration apparatus 500 can be configured to vibrate the display member 100. The vibration apparatus 500 can vibrate based on a driving signal applied from a driving circuit part to vibrate the display member 100, and thus, can output one or more of a sound and a haptic feedback (or a haptic vibration). For example, the vibration apparatus 500 can vibrate the display member 100 to provide a user with a tactile feedback including a virtual texture. For example, the vibration apparatus 500 can vibrate the display member 100 to provide a user with a tactile feedback including a virtual texture and a virtual sound texture. For example, the virtual texture can be implemented as a texture which differs from a surface texture of the display member 100 recognized by a user through a finger or a touch pen 10 when the user touches a surface (or a screen) of the display member 100 with the finger or the touch pen 10. For example, the virtual sound texture can be implemented as an acoustic texture corresponding to the virtual texture, i.e. the virtual sound texture can be implemented as a sound which differs from a sound generated when the user touches a surface (or a screen) of the display member 100 with the finger or the touch pen 10. For example, the virtual texture can be a touch texture, a haptic texture, or a tactile texture. For example, the virtual sound texture can be a sound touch texture, a sound haptic texture, or a sound tactile texture. For example, the finger of the user or the touch pen 10 can be a haptic object. In the following descriptions, a haptic object can be the finger of the user or the touch pen 10. In other words, the virtual texture can be described as simulating or replicating a texture of a material different to that of the surface of the display member 100, i.e. simulating or replicating a vibration generated when writing on that different material, e.g. using a pen with a nib. The virtual texture can be supplied to the user to simulate or replicate the texture or vibration or friction experienced by a user when writing on that different material. Similarly, the virtual sound texture can be described as simulating or replicating a vibration or sound generated when writing on a different material to that of the surface of the display member 100, e.g. with a pen with a nib. The virtual sound texture can be supplied to the user to simulate or replicate the vibration or sound heard by a user when writing on that different material.

The vibration apparatus 500 can vibrate based on a haptic driving signal to output an ultrasonic wave, and thus, can provide a virtual texture to the haptic object. For example, the vibration apparatus 500 can vibrate the display member 100, based on the haptic driving signal including a texture signal (or a texture pattern), and thus, can be configured to output an ultrasonic wave (or a haptic ultrasonic or a haptic texture ultrasonic or a low frequency haptic or an ultrasonic vibration). For example, the ultrasonic output from the vibration apparatus 500 can generate a squeeze film effect to provide a tactile feedback to the haptic object. The squeeze film effect can be referred to as surface ultrasonic lubrication, and the surface ultrasonic lubrication can change a friction coefficient (or a frictional force) between the haptic object and the display member 100 through changing of a friction coefficient of a surface of the display member 100 to implement fine texture or roughness recognizable by the user. Accordingly, when there is a user's touch, the vibration apparatus 500 can generate an ultrasonic corresponding to the haptic driving signal to change (or control) the friction coefficient (or a frictional force) of the surface of the display member 100, and thus, can provide a virtual texture effect to the haptic object, thereby providing the user with a virtual texture which is equal or similar to an actual texture.

The haptic driving signal according to an embodiment of the present disclosure can include or can be based on an ultrasonic signal and/or a texture signal. For example, the haptic driving signal can be a synthesis signal of an ultrasonic signal and a texture signal. In other words, the haptic driving signal can comprise a synthesis or combination or superposition of an ultrasonic signal and a texture signal.

The haptic driving signal according to an embodiment of the present disclosure can have a frequency of 20 kHz or more. For example, the ultrasonic signal can have a frequency which is higher than a resonance frequency of the vibration apparatus 500, to generate ultrasonic resonance. For example, the ultrasonic signal can have a frequency of 27 kHz or more, but embodiments of the present disclosure are not limited thereto.

The texture signal of the haptic driving signal according to an embodiment of the present disclosure can include or provide a virtual texture or a virtual haptic texture which is equal or similar to an actual texture, with respect to a user. For example, the texture signal can be a virtual texture signal, a virtual haptic signal, a texture shape signal, a texture pattern signal, a haptic texture signal, a haptic texture pattern signal, a surface roughness signal, or a low frequency signal.

The texture signal according to an embodiment of the present disclosure can correspond to a texture based on a nib material of the touch pen 10, or can correspond to a texture (or surface roughness) based on a material of a touch object. According to an embodiment of the present disclosure, a nib of the touch pen 10 can include one or more materials of plastic, rubber, fabric, graphite, wood, and wax, but embodiments of the present disclosure are not limited thereto. For example, the nib of the touch pen 10 can be the same as a nib material of a fountain pen, a ball point pen, a pencil, a colored pencil, a marker pen, a permanent marker, a highlighter or the like. For example, the touch object can include one or more materials of paper, plastic, rubber, fabric, glass, wood, and metal, but embodiments of the present disclosure are not limited thereto.

The texture signal according to an embodiment of the present disclosure can be generated from texture information (or texture simulation information) based on a surface friction (or a vibration acceleration or a friction vibration acceleration) which occurs in writing (or drawing) of the haptic object corresponding to the touch object. The texture information can be generated by a texture simulation method which analyzes and quantifies (or datafication) a surface friction occurring in writing (or drawing) of the haptic object corresponding to the touch object. For example, the texture signal includes texture information based on one or more materials of paper, plastic, rubber, fabric, glass, wood, and metal, but embodiments of the present disclosure are not limited thereto. In other words, the texture signal can be described as simulating or replicating a texture of a material different to that of the surface of the display member 100, i.e. simulating or replicating a vibration generated when writing on that different material, e.g. with a pen with a nib. The texture signal can be supplied to the user as part of the haptic driving signal to simulate or replicate the texture or vibration experienced by a user when writing on that different material.

The texture signal according to an embodiment of the present disclosure can have a low frequency band. For example, the texture signal can have a frequency band of 600 Hz or less for enabling a user to recognize a haptic texture. For example, the texture signal or the haptic driving signal can have a plurality of low frequencies. For example, the texture signal or the haptic driving signal can have a plurality of low frequencies in a frequency band of 50 Hz to 600 Hz. For example, the texture signal or the haptic driving signal can have a plurality of peaks corresponding to a haptic texture (or a virtual texture or an ultrasonic haptic texture) in a frequency band of 50 Hz to 600 Hz. For example, the haptic driving signal can have a plurality of low frequencies respectively corresponding to a plurality of peaks corresponding to a haptic texture in a frequency band of 50 Hz to 600 Hz.

The vibration apparatus 500 can include a piezoelectric material or an electroactive material which have a piezoelectric characteristic. The vibration apparatus 500 can autonomously vibrate (or displace or drive) based on a vibration (or displacement) of the piezoelectric material based on a vibration driving signal or a haptic driving signal applied to the piezoelectric material, or can vibrate (or displace or drive) the display member 100. The vibration apparatus 500 can alternately repeat contraction and/or expansion based on a piezoelectric effect (or a piezoelectric characteristic) to vibrate (or displace or drive). For example, the vibration apparatus 500 can vibrate (or displace or drive) in a vertical direction (or a thickness direction) Z as contraction and/or expansion are alternately repeated by an inverse piezoelectric effect. For example, the vibration apparatus 500 can be an active vibration member, a vibration generator, a vibrator, a vibration generating device, a vibration generating element, an actuator, an exciter, an ultrasonic generator, an ultrasonic actuator, or the like, but embodiments of the present disclosure are not limited thereto.

The vibration apparatus 500 according to an embodiment of the present disclosure can be configured as a ceramic-based piezoelectric material capable of implementing a relatively high vibration, or can be configured as a piezoelectric ceramic having a perovskite-based crystalline structure.

The vibration apparatus 500 can be connected or coupled to the display member 100 by a connection member 600. For example, the vibration apparatus 500 can be connected to or supported by the rear surface of the display member 100 by the connection member 600, but embodiments of the present disclosure are not limited thereto. For example, the vibration apparatus 500 can be connected to the rear surface of the display panel 110 of the display member 100 by the connection member 600. For example, the vibration apparatus 500 can be connected to the plate member 115 of the display panel 110 by the connection member 600. The vibration apparatus 500 can vibrate a plate member 115 to vibrate the display member 100, and thus, can generate an ultrasonic (or a haptic ultrasonic or a haptic texture ultrasonic or a low frequency haptic or an ultrasonic vibration) at a surface of the display member 100. For example, the ultrasonic (or a haptic ultrasonic or a haptic texture ultrasonic or a low frequency haptic or ultrasonic vibration) generated at the surface of the display member 100 can generate a compressed air pattern at the surface of the display member 100, and thus, can change a friction coefficient (or a frictional force) between the haptic object and the display member 100 to implement fine texture or roughness recognizable by the user. Accordingly, as the friction coefficient (or the frictional force) between the haptic object and the display member 100 is changed, the user can recognize a virtual texture corresponding to a haptic texture of a low frequency band included in an ultrasonic instead of a texture of the display member 100.

Figure 3:
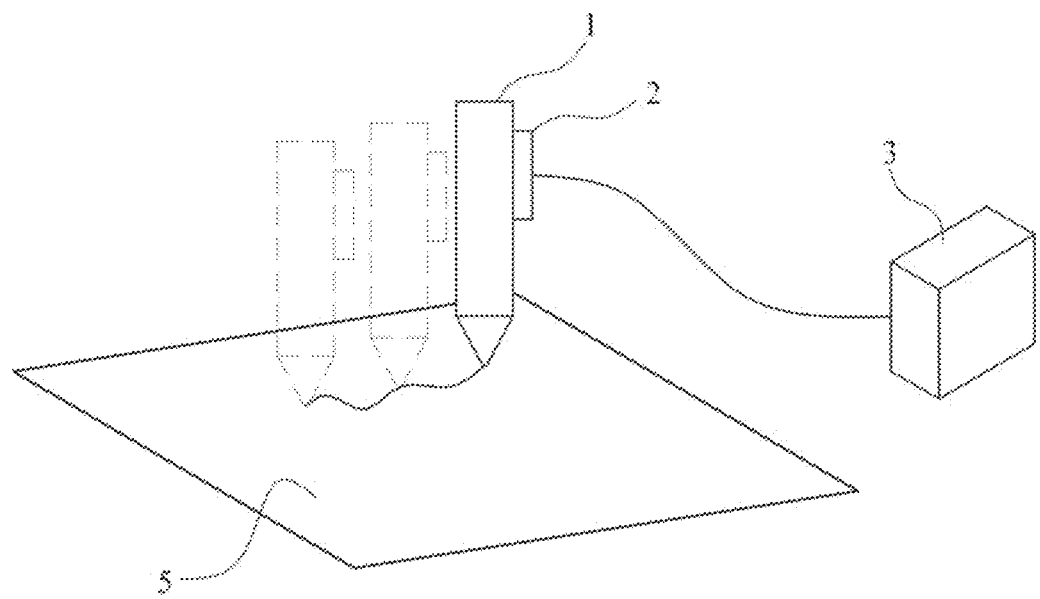
FIG. 3 illustrates a texture simulation apparatus for transferring a texture signal according to an embodiment of the present disclosure.

FIG. 3 illustrates a texture simulation apparatus for transferring a texture signal according to an embodiment of the present disclosure.

With reference to FIG. 3, the texture simulation apparatus according to an embodiment of the present disclosure can include a texture object 5, a touch pen (or a simulation touch pen) 1, a vibration acceleration sensor 2 disposed at the touch pen 1, and a signal analysis apparatus 3 connected to the vibration acceleration sensor 2.

The texture object 5 can include one or more materials of paper, plastic, rubber, fabric, glass, wood, metal or the like, but embodiments of the present disclosure are not limited thereto. The touch pen 1 can include a nib which is configured in or comprises a material of paper, plastic, rubber, fabric, glass, wood, metal or the like, but embodiments of the present disclosure are not limited thereto. For example, the touch pen 1 can be a fountain pen, a ball point pen, a pencil, a colored pencil, a marker pen, a permanent marker, a highlighter or the like, but embodiments of the present disclosure are not limited thereto.

The vibration acceleration sensor 2 can be configured to output a signal corresponding to a vibration of the touch pen 1 which is slid (or drawn) while contacting the texture object 5. For example, the vibration acceleration sensor 2 can output a sensing raw signal (or a friction vibration acceleration signal) corresponding to a friction vibration of the touch pen 1 based on surface roughness (or a surface texture) of the texture object 5.

The signal analysis apparatus 3 can receive and store the sensing raw signal output from the vibration acceleration sensor 2. The signal analysis apparatus 3 can analyze a frequency-based intensity of the stored sensing raw signal to generate texture information about the texture object 5. For example, the signal analysis apparatus 3 can perform fast Fourier transform (FFT) on the sensing raw signal to analyze frequency-based intensity, and thus, can generate the texture information about the texture object 5.

Figure 4A:
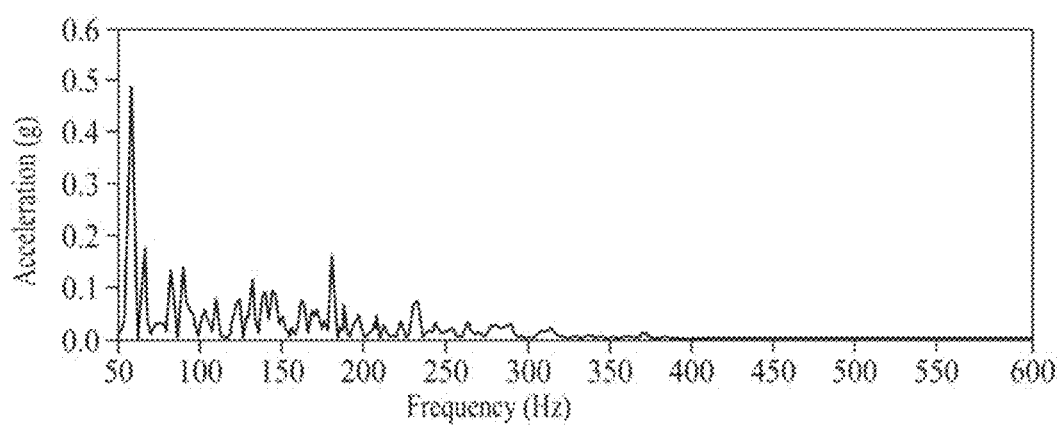
FIG. 4A illustrates a frequency-based vibration acceleration with respect to an X-axis direction, for texture object comprising a paper material, in an XYZ coordinate system.
Figure 4B:
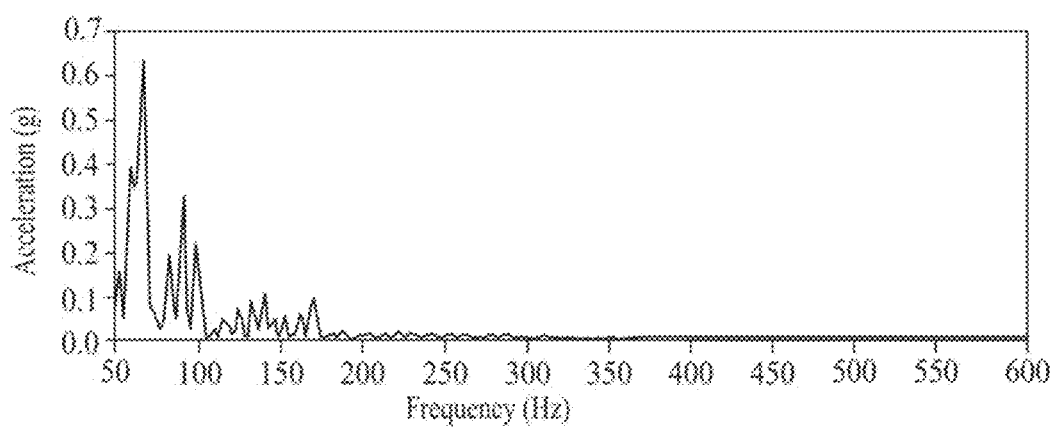
FIG. 4B illustrates a frequency-based vibration acceleration with respect to a Y-axis direction, for the texture object comprising a paper material, in the XYZ coordinate system.
Figure 4C:
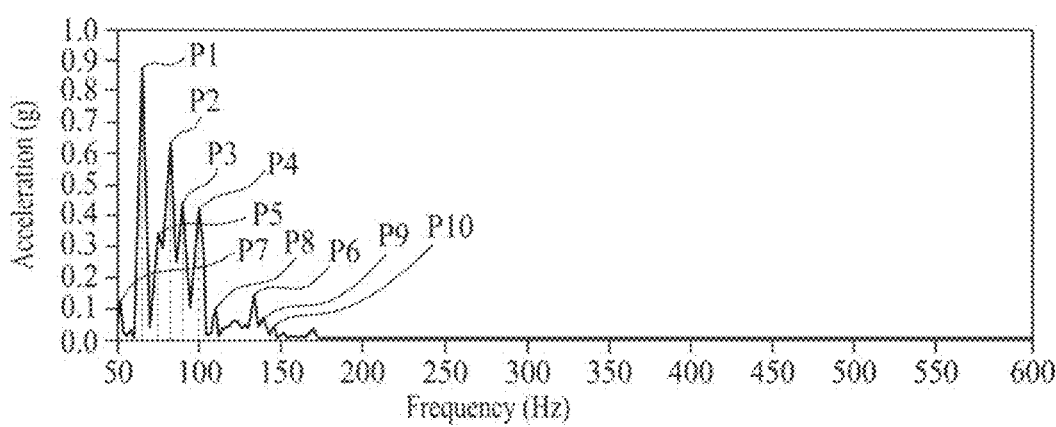
FIG. 4C illustrates a frequency-based vibration acceleration with respect to a Z-axis direction, for the texture object comprising a paper material, in the XYZ coordinate system.

FIG. 4A illustrates an example of a frequency-based vibration acceleration with respect to an X-axis direction, for a texture object comprising a paper material, in an XYZ coordinate system. FIG. 4B illustrates an example of a frequency-based vibration acceleration with respect to a Y-axis direction, for the texture object comprising the paper material, in the XYZ coordinate system. FIG. 4C illustrates an example of a frequency-based vibration acceleration with respect to a Z-axis direction, for the texture object comprising the paper material, in the XYZ coordinate system. Particularly, FIGS. 4A to 4C illustrate frequency-based vibration accelerations with respect to the X-axis direction, the Y-axis direction, and the Z-axis direction, which are obtained through FFT performed on a sensing raw signal of a vibration acceleration sensor based on sliding of the touch pen as illustrated in FIG. 3. As used herein, frequency-based vibration acceleration can be referred to merely as acceleration, or as acceleration as a function of frequency.

In FIGS. 4A to 4C, it can be seen that a frequency-based vibration acceleration corresponding to a paper material has about 0.5 g in a frequency band of 100 Hz to 600 Hz with respect to each of the X-axis direction, the Y-axis direction, and the Z-axis direction. For example, a person can recognize a vibration through a tangoreceptor of a finger and can recognize a vibration of a frequency band of 2 Hz to 600 Hz. Therefore, texture information can have a frequency band of 2 Hz to 600 Hz. For example, the texture information can be generated based on a frequency-based vibration acceleration with respect to one direction of the X-axis direction, the Y-axis direction, and the Z-axis direction. For example, the texture information can be generated based on a frequency-based vibration acceleration with respect to a Z-axis direction of a texture object where a frequency-based vibration acceleration is relatively high.

Figure 5:
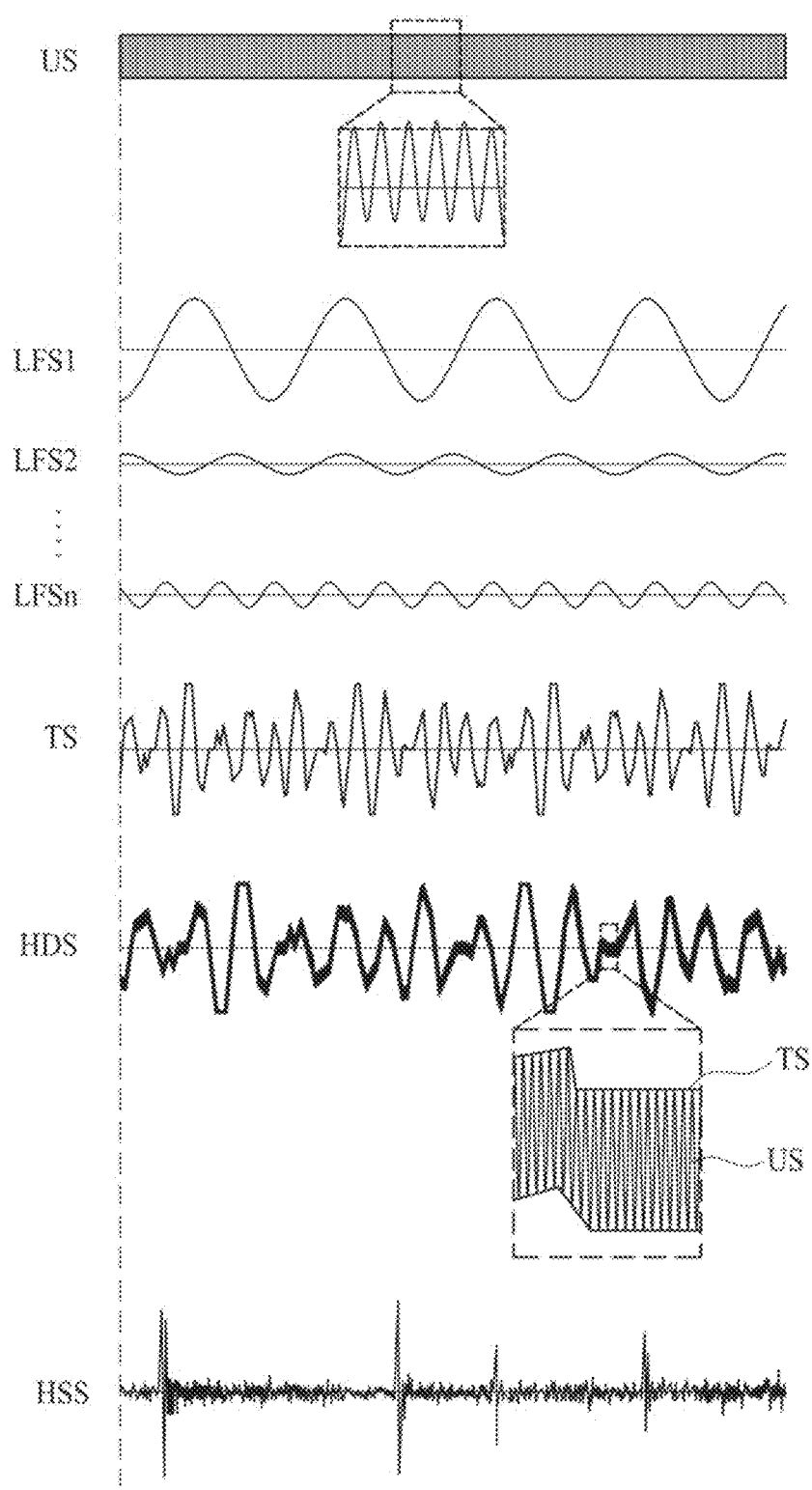
FIG. 5 illustrates an example of a haptic driving signal according to an embodiment of the present disclosure.

FIG. 5 illustrates an example of a haptic driving signal according to an embodiment of the present disclosure.

With reference to FIG. 5, a haptic driving signal HDS can include a texture signal TS and an ultrasonic signal US. For example, the haptic driving signal HDS can be generated through an amplitude modulation of the ultrasonic signal US based on the texture signal TS.

The texture signal TS can be generated based on texture information about a texture object. The texture signal TS can have a low frequency band. For example, the texture signal TS can have a frequency band of 600 Hz or less for enabling a user to recognize a haptic texture. For example, the texture signal TS can include a synthesis signal (or a combination signal or a superposition signal) of a plurality of frequencies among a frequency band of 50 Hz to 600 Hz.

The texture signal TS can be generated based on a plurality of peaks in a frequency band of 100 Hz to 600 Hz in the texture information. For example, the texture signal TS can be generated based on each of a plurality of peaks in a frequency band of 100 Hz to 600 Hz, in the texture information corresponding to a frequency-based vibration acceleration with respect to a Z-axis direction of a texture object where is relatively large. For example, with reference to FIG. 4C, the texture signal TS can be generated based on a plurality of upper peaks P1 to P9 having a vibration acceleration of a reference value (for example, 0.05 g) or more among a plurality of peaks P1 to P10 in a frequency band of 100 Hz to 600 Hz, but embodiments of the present disclosure are not limited thereto. For example, the texture signal TS can be generated based on the plurality of upper peaks P1 to P5, corresponding to the upper 50%, among the plurality of peaks P1 to P10 in a frequency band of 100 Hz to 600 Hz, but embodiments of the present disclosure are not limited thereto. In other words, for a plurality of peaks identified in a frequency band, the plurality of upper peaks can be selected as a subset of the plurality of peaks. The plurality of upper peaks can be the peaks having the largest amplitude (i.e. largest acceleration) amongst the plurality of peaks. The plurality of upper peaks can be selected to comprise a defined percentage of the plurality of peaks or can be selected to comprise all of the plurality of peaks which exceed a defined amplitude (acceleration) value.

The texture signal TS according to an embodiment of the present disclosure can be a synthesis signal (or a combination signal or a superposition signal) of (or using) a plurality of low frequency signals LFS1, LFS2, ... LFSn based on the texture information.

The plurality of low frequency signals LFS1 to LFSn can have different frequencies. For instance, the plurality of low frequency signals LFS1 to LFSn can have different frequencies in a frequency band of 100 Hz to 600 Hz. Each of the plurality of low frequency signals LFS1 to LFSn can have a frequency corresponding to a respective upper peak of a plurality of upper peaks in a frequency band of 100 Hz to 600 Hz in the texture information corresponding to a frequency-based vibration acceleration for the texture object.

For example, as illustrated in FIG. 4C, the texture signal TS can be a synthesis signal (or a combination signal or a superposition signal) of a plurality of low frequency signals respectively corresponding to the plurality of upper peaks P1 to P5 in a frequency band of 100 Hz to 600 Hz, in the frequency-based vibration acceleration with respect to the Z-axis direction of the texture object. For example, as illustrated in FIG. 4C, the texture signal TS can be a synthesis signal of first to fifth low frequency signals (or frequency synthesis signals) respectively corresponding to first to fifth upper peaks P1 to P5.

The first low frequency signal LFS1 corresponding to the first upper peak P1 can have a frequency of 65 Hz, the second low frequency signal LFS2 corresponding to the second upper peak P2 can have a frequency of 82.5 Hz, the third low frequency signal corresponding to the third upper peak P3 can have a frequency of 90 Hz, the fourth low frequency signal corresponding to the fourth upper peak P4 can have a frequency of 100 Hz, and a fifth low frequency signal corresponding to a fifth upper peak P5 can have a frequency of 75 Hz. Therefore, the texture signal TS can be generated through a frequency synthesis of the first low frequency signal LFS1 of 65 Hz, the second low frequency signal of 82.5 Hz, the third low frequency signal of 90 Hz, the fourth low frequency signal of 100 Hz, and the fifth low frequency signal of 75 Hz. Accordingly, the texture signal TS can be generated based on a frequency of each of a plurality of upper peaks, in a frequency-based vibration acceleration of a texture object based on texture information, and thus, can have a frequency-based vibration acceleration which is equal or similar to a texture of the texture object.

The ultrasonic signal US can have a frequency of 20 kHz or more. For example, the ultrasonic signal US can have a frequency which is higher than a resonance frequency of the vibration apparatus 500, in order to generate ultrasonic resonance. For example, the ultrasonic signal US can have a frequency of 27 kHz or more, but embodiments of the present disclosure are not limited thereto.

The haptic driving signal HDS according to an embodiment of the present disclosure can further include the texture signal TS and the ultrasonic signal US. For example, the haptic driving signal HDS can be generated through an amplitude modulation of the ultrasonic signal US based on the texture signal TS. The haptic driving signal HDS according to an embodiment of the present disclosure can be converted into haptic texture data through an analog-to-digital conversion and can have the form of data or can be stored in a database. Accordingly, the haptic texture data can include frequency information about the texture signal TS and frequency information about the ultrasonic signal US. For example, the haptic texture data can be texture pattern data, haptic texture pattern data, virtual texture data, virtual haptic data, or texture shape data, but embodiments of the present disclosure are not limited thereto.

According to another embodiment of the present disclosure, the haptic driving signal HDS can further include a haptic sound signal HSS.

The haptic sound signal HSS can include haptic sound information about a texture object collected through a microphone included in the texture simulation apparatus described above. For example, the microphone can be disposed in the touch pen 1 or can be disposed at a periphery of the texture object, and can be configured to collect a friction sound (or a haptic sound) which is generated when the touch pen 1 is slid (or drawn).

The haptic driving signal HDS according to another embodiment of the present disclosure can include the texture signal TS, the ultrasonic signal US, and the haptic sound signal HSS. As an embodiment of the present disclosure, the haptic driving signal HDS can include a synthesis of the haptic sound signal HSS and an ultrasonic amplification signal generated through an amplitude modulation of the ultrasonic signal US based on the texture signal TS. For example, the haptic driving signal HDS can be generated by a frequency synthesis of the haptic sound signal HSS and the ultrasonic amplification signal. As another embodiment of the present disclosure, the haptic driving signal HDS can be generated by an amplitude modulation of the ultrasonic signal US based on frequency synthesis of the haptic sound signal HSS and the texture signal TS.

The haptic driving signal HDS according to another embodiment of the present disclosure can be converted into haptic texture data by analog-to-digital conversion and can have the form of data or can be stored in a database. Accordingly, the haptic texture data can include frequency information of the texture signal TS, frequency information of the ultrasonic signal US, and frequency information of the haptic sound signal HSS. For example, the haptic driving signal HDS or the haptic texture data including the haptic sound signal HSS can be texture/sound pattern data, haptic texture/sound pattern data, virtual texture/sound data, virtual haptic/sound data, or texture shape/sound data.

According to an embodiment of the present disclosure, the haptic texture data can be stored in a storage device in a lookup table form. The haptic texture data can be mapped, arranged or categorized based on or according to different texture objects. In other words, haptic texture data for different texture objects can be stored in and accessible from different parts of the storage device. For example, the haptic texture data can be generated for texture objects by a texture simulation method on each of various texture objects having different materials (or textures), and the haptic texture data for each texture object can be stored in the storage device in a lookup table form. As an embodiment of the present disclosure, the storage device storing the haptic texture data can be configured or disposed at a driving circuit part of the display apparatus. As another embodiment of the present disclosure, the haptic texture data can be configured or disposed at the storage device of the driving circuit part of the display apparatus, but embodiments of the present disclosure are not limited thereto. For example, the haptic texture data can be stored in a storage circuit of a vibration driver for driving a vibration apparatus, or can be stored in a storage circuit of a host controller of the display apparatus.

Figure 6:
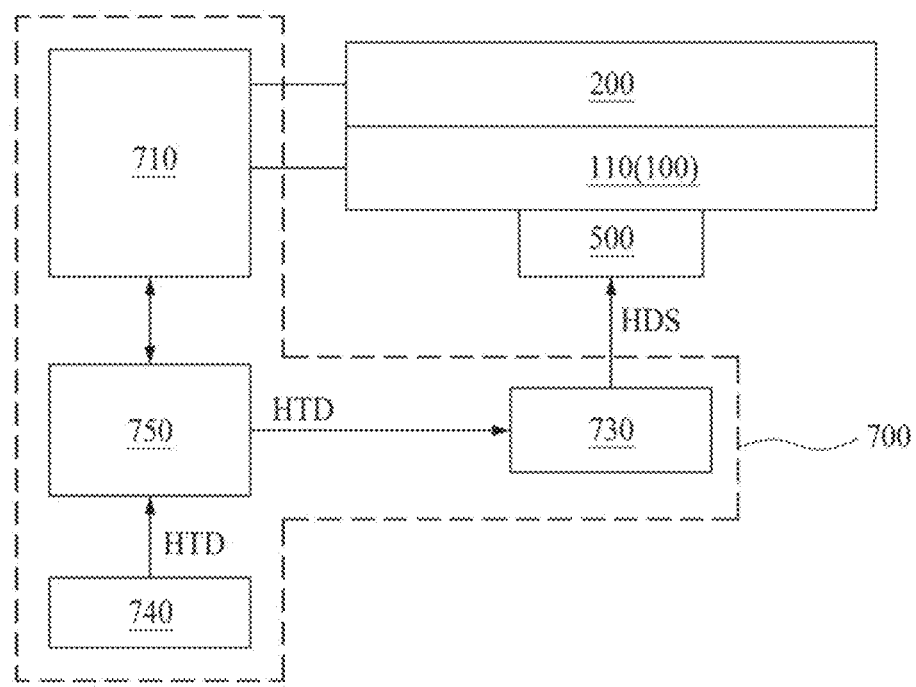
FIG. 6 illustrates a driving circuit part of a display apparatus according to an embodiment of the present disclosure.

FIG. 6 illustrates a driving circuit part of a display apparatus according to an embodiment of the present disclosure.

With reference to FIG. 6, a driving circuit part 700 of the display apparatus according to an embodiment of the present disclosure can be electrically connected to each of a display panel 110, a touch panel 200, and a vibration apparatus 500.

The driving circuit part 700 can be configured to display an image on the display panel 110. The driving circuit part 700 can sense a user's touch by using the touch panel 200 to detect a touch position (or touch position information) and can execute an application corresponding to the touch position information. Further, the driving circuit part 700 can be configured to supply the vibration apparatus 500 with a haptic driving signal HDS for providing a user with a virtual texture of a touch region.

The driving circuit part 700 according to an embodiment of the present disclosure can include a display driver 710, a vibration driver 730, a host controller 750, and a storage device 740.

The display driver 710 can be configured to display an image on the display panel 110 based on control by the host controller 750. The display driver 710 can receive video data and a timing synchronization signal supplied from the host controller 750 and can display an image corresponding to the video data on a display portion of the display panel 110 based on the timing synchronization signal. For example, the display driver 710 can include a data driver, a touch driver, and a timing controller.

The data driver can be configured to be electrically connected to a data line in the display panel 110. The data driver can be configured to output a data signal, corresponding to pixel data supplied from a timing controller, to the data line.

The touch driver can be electrically connected to a touch electrode in the touch panel 200. In response to a touch synchronization signal supplied from the timing controller, the touch driver can generate touch raw data based on a user's touch by a haptic object and can supply the generated touch raw data to the host controller 750, but embodiments of the present disclosure are not limited thereto. For example, the touch driver can analyze the touch raw data to generate touch coordinate data and can be configured to supply the touch coordinate data to the host controller 750.

The timing controller can be configured to control each of a data driver and a touch driver. The timing controller can receive video data and the timing synchronization signal supplied from the host controller 750, convert the video data into pixel data, supply the pixel data to the data driver, and control a driving timing of each of the data driver and the touch driver based on the timing synchronization signal. The timing controller can control a driving timing of a scan driving circuit in the display panel 110 based on the timing synchronization signal.

The vibration driver 730 can be configured to vibrate the vibration apparatus 500. The vibration driver 730 can generate the haptic driving signal HDS corresponding to haptic texture data HTD supplied from the host controller 750 and can supply the haptic driving signal HDS to the vibration apparatus 500.

The vibration driver 730 according to an embodiment of the present disclosure can include a digital-to-analog converter which digital-analog converts and outputs the haptic texture data HTD and an amplification circuit part which amplifies an output signal of the digital-to-analog converter to generate the haptic driving signal HDS. The amplification circuit part can include a preamplifier which primarily amplifies the output signal of the digital-to-analog converter and a main amplifier which additionally amplifies an amplification signal of the preamplifier to generate the haptic driving signal HDS and supplies the generated haptic driving signal HDS to the vibration apparatus 500.

The vibration apparatus 500 according to an embodiment of the present disclosure can vibrate based on the haptic driving signal HDS to vibrate the display member 100 including the display panel 110, and thus, can generate an ultrasonic (or a haptic ultrasonic or a haptic texture ultrasonic or a low frequency haptic or an ultrasonic vibration) at the surface of the display member 100. Therefore, the vibration apparatus 500 can change a friction coefficient (or a frictional force) between the display member 100 and a haptic object which is slid (or drawn) on the display member 100, thereby providing a user with a virtual texture which is equal or similar to an actual texture. Accordingly, as the friction coefficient (or the frictional force) between the haptic object and the display member 100 is changed, the user can recognize a different texture (for example, a paper texture) instead of a texture of the display member 100. In other words, the haptic driving signal can be configured to cause a vibration which, when the haptic object is slid on the display member 100, causes the haptic object to vibrate with different frequencies and/or amplitudes to the vibration or friction it would experience based on the friction between the haptic object and the display member 100 without the haptic driving signal being applied. The change to the vibration or friction at the haptic object due to the haptic driving signal can change the texture experienced at the haptic object, for example as felt by the user. The changed texture can simulate or replicate a texture different to the texture of the display member 100, for example can simulate the texture of a pen writing on paper.

The vibration apparatus 500 according to another embodiment of the present disclosure can vibrate based on the haptic driving signal HDS including the haptic sound signal HSS to vibrate the display member 100 including the display panel 110, and thus, can generate an ultrasonic (or a haptic ultrasonic or a haptic texture ultrasonic or a low frequency haptic or an ultrasonic vibration) at the surface of the display member 100. Simultaneously, the vibration apparatus 500 can generate a haptic sound and can change a friction coefficient (or a frictional force) between the display member 100 and a haptic object which is slid (or drawn) in the display member 100, and thus, can provide a user with a virtual texture which is equal or similar to an actual texture and simultaneously can provide a sound (or a haptic sound or a low frequency haptic sound) corresponding to the virtual texture. Accordingly, as the friction coefficient (or the frictional force) between the haptic object and the display member 100 is changed, the user can simultaneously recognize a different texture (for example, a paper texture, and a pen sound corresponding to the paper texture) instead of a surface texture of the display member 100.

The host controller 750 can be configured to provide the video data and the timing synchronization signal to the display driver 710. The host controller 750 can execute an application corresponding to touch raw data or touch coordinate information supplied from the display driver 710, and simultaneously, can provide the vibration driver 730 with the haptic texture data HTD for providing the virtual texture to the haptic object.

The host controller 750 can select the haptic texture data HTD, which is adjusted by the user or corresponds to a haptic texture desired by the user, in a lookup table stored in the storage device 740 and can supply the haptic texture data HTD to the vibration driver 730.

The driving circuit part 700 of the display apparatus according to an embodiment of the present disclosure can supply the haptic driving signal HDS to the vibration apparatus 500 based on a user's touch, and based on the haptic object to vibrate the vibration apparatus 500, and thus, can generate an ultrasonic (or a haptic ultrasonic or a haptic texture ultrasonic or a low frequency haptic or an ultrasonic vibration) at the surface of the display member 100 based on a vibration of the display member 100 based on a vibration of the vibration apparatus 500 and can provide the user with a virtual texture and/or a haptic sound (or a low frequency haptic sound) which differ(s) from a texture of the surface of the display member 100.

Figure 7:
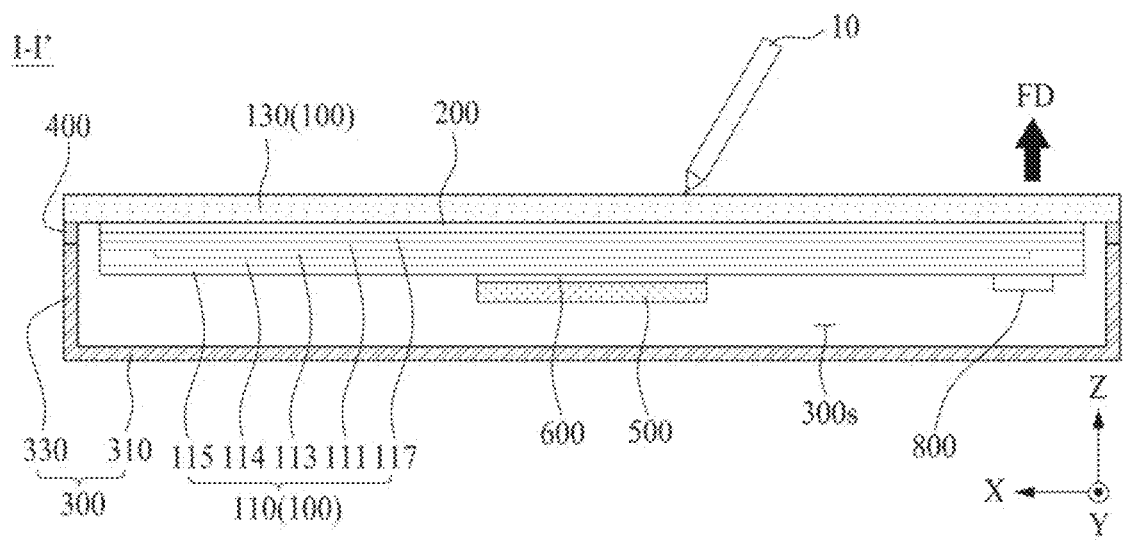
FIG. 7 is another example of a cross-sectional view of a display apparatus taken along line I-I' in FIG. 1 according to an embodiment of the present disclosure.
Figure 8:
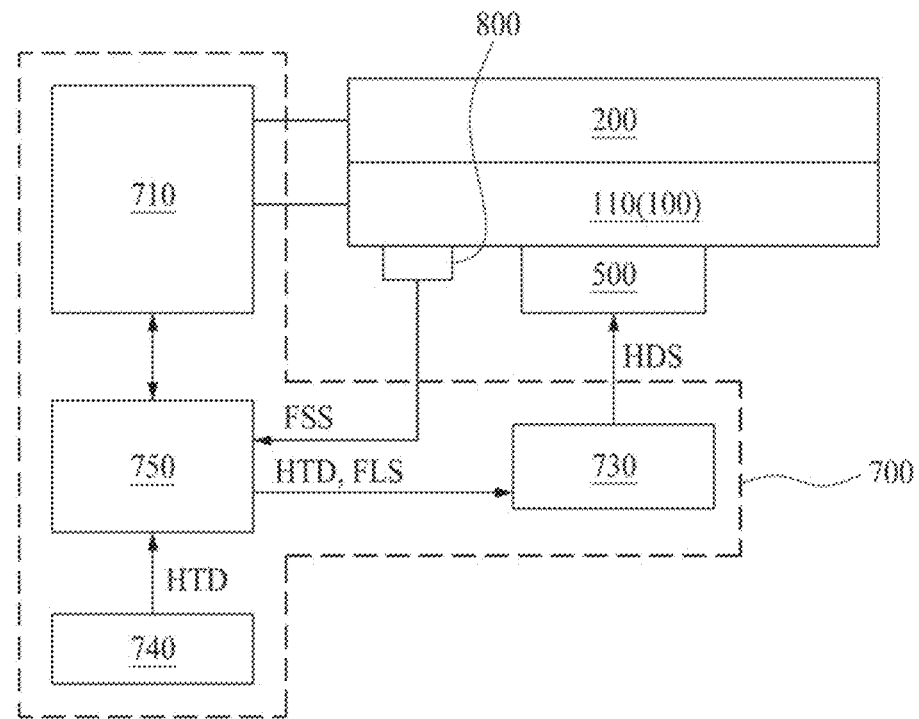
FIG. 8 illustrates a driving circuit part of a display apparatus according to another embodiment of the present disclosure.

FIG. 7 is another example of a cross-sectional view of a display apparatus taken along line I-I' in FIG. 1. FIG. 8 illustrates a driving circuit part of a display apparatus according to another embodiment of the present disclosure. Particularly, FIG. 7 illustrates an embodiment where a force sensing member is additionally provided in the display apparatus according to an embodiment of the present disclosure described above with reference to FIGS. 1 to 6. A display apparatus according to another embodiment of the present disclosure can further include a force sensing member. Hereinafter, in describing the display apparatus according to another embodiment of the present disclosure, elements differing from the elements of the display apparatus according to an embodiment of the present disclosure will be mainly described. Descriptions of the display apparatus according to an embodiment of the present disclosure described above with reference to FIGS. 1 to 6 can be included in descriptions of the display apparatus according to another embodiment of the present disclosure.

With reference to FIGS. 7 and 8, a display apparatus according to another embodiment (or a second embodiment) of the present disclosure can further include a force sensing member 800.

The force sensing member 800 can be configured to sense a touch strength (or a touch force or a pen pressure) of a user using a haptic object. The force sensing member 800 can be configured or disposed at or on the display member 100. The force sensing member 800 can be configured to sense bending of the display member 100 based on a user's touch. The force sensing member 800 can be connected to or attached on the rear surface of the display panel 110. For example, the force sensing member 800 can be connected or attached on a rear edge portion (or a rear periphery portion) of the display panel 110. The force sensing member 800 can be connected or attached on a rear surface of the front member 130. For example, the force sensing member 800 can be connected to or attached on a rear edge portion (or a rear periphery portion) of the front member 130.

The force sensing member 800 according to an embodiment of the present disclosure can comprise or be configured with a piezoelectric device, but embodiments of the present disclosure are not limited thereto. The piezoelectric device of the force sensing member 800 can output an electrical signal based on a piezoelectric effect. Accordingly, the piezoelectric device can output a force sensing raw signal FSS corresponding to an electrical signal which is generated as the display member 100 is bent (or deformed) by a user's touch.

In the display apparatus according to another embodiment of the present disclosure, the driving circuit part 700 can receive the force sensing raw signal FSS supplied from the force sensing member 800 and can generate a force level signal FLS corresponding to a touch strength of the user based on the force sensing raw signal FSS. For example, the force level signal FLS can be generated by the host controller 750 of the driving circuit part 700, but embodiments of the present disclosure are not limited thereto. For example, the force sensing raw signal FSS can be supplied from the vibration driver 730, and the vibration driver 730 can generate the force level signal FLS corresponding to the touch strength of the user based on the force sensing raw signal FSS.

According to an embodiment of the present disclosure, when the touch strength of the user is high, the force level signal FLS can have a relatively high voltage level, and when the touch strength of the user is low, the force level signal FLS can have a relatively low voltage level, but embodiments of the present disclosure are not limited thereto.

The vibration driver 730 can be configured to adjust an intensity of the haptic driving signal HDS based on the force level signal FLS. For example, the preamplifier or the main amplifier included in the vibration driver 730 can be configured to adjust an intensity of the haptic driving signal HDS based on the force level signal FLS. For example, the intensity of the haptic driving signal HDS can be adjusted by adjusting a gain value of the preamplifier or the main amplifier, based on the force level signal FLS. For example, when the force level signal FLS has a relatively high voltage level, the intensity of the haptic driving signal HDS can increase, and when the force level signal FLS has a relatively low voltage level, the intensity of the haptic driving signal HDS can decrease.

The display apparatus according to another embodiment (or a second embodiment) of the present disclosure can provide the same effect as that of the display apparatus according to an embodiment (or a first embodiment) of the present disclosure. Further, the display apparatus according to another embodiment of the present disclosure can further include the force sensing member 800, and thus, can adjust virtual texture intensity corresponding to the touch strength of the user.

Figure 9:
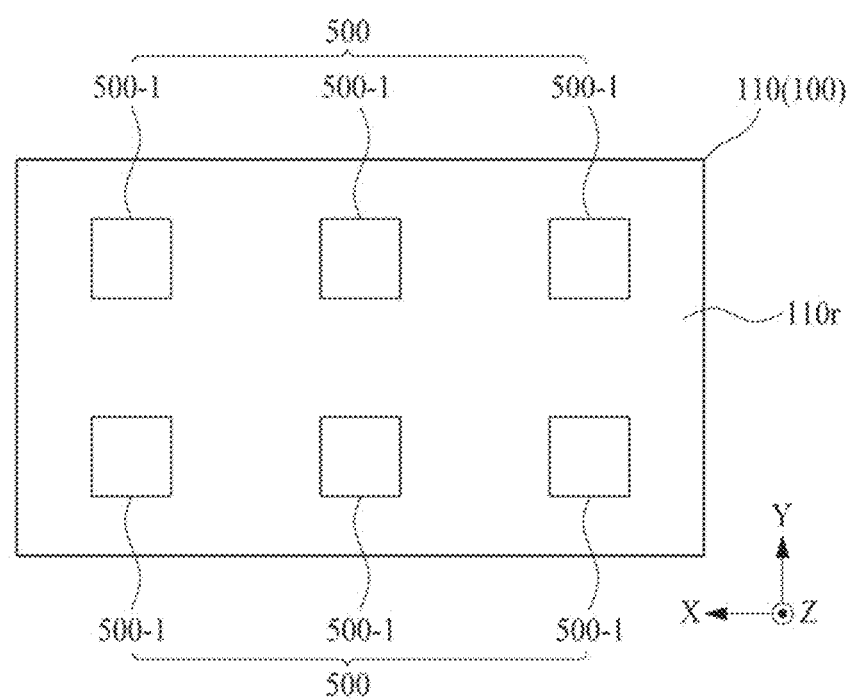
FIG. 9 illustrates a display apparatus according to another embodiment of the present disclosure.

FIG. 9 illustrates a display apparatus according to another embodiment (or a third embodiment) of the present disclosure. More specifically, FIG. 9 illustrates an embodiment implemented by modifying the vibration apparatus of the display apparatus according to the first and second embodiments of the present disclosure described above with reference to FIGS. 1 to 8. In the following descriptions, therefore, the other elements except a vibration apparatus are referred to by like reference numerals, and repeated descriptions thereof are omitted. The descriptions of the display apparatus according to the first and second embodiments of the present disclosure described above with reference to FIGS. 1 to 8 can be included in descriptions of a display apparatus according to the third embodiment of the present disclosure.

With reference to FIG. 9, in a display apparatus according to the third embodiment of the present disclosure, a vibration apparatus 500 can include a plurality of ultrasonic generators 500-1.

The plurality of ultrasonic generators 500-1 can be disposed to be spaced apart from one another at or connected to a rear surface 110r of a display member 100. The plurality of ultrasonic generators 500-1 can be disposed to be spaced apart from one another at or connected to a rear surface 110r of a display panel 110. For example, the plurality of ultrasonic generators 500-1 can be disposed to be spaced apart from one another at or connected to the rear surface 110r of the display panel 110 by a connection member 600 (see FIG. 2).

Each of the plurality of ultrasonic generators 500-1 can vibrate based on the haptic driving signal supplied from the vibration driver 730 of the driving circuit part 700 described above with reference to FIG. 6 or 8 to vibrate a display member 100, and thus, can generate a haptic sound (or a low frequency haptic sound) and/or an ultrasonic (or a haptic ultrasonic or a haptic texture ultrasonic or a low frequency haptic or an ultrasonic vibration) at a surface of the display member 100.

The display member 100 or the display panel 110 can include a plurality of haptic regions (or ultrasonic generating regions) which respectively correspond to or overlap the plurality of ultrasonic generators 500-1.

Each of the plurality of ultrasonic generators 500-1 can be simultaneously driven, or can be individually driven, but embodiments of the present disclosure are not limited thereto. For example, one or more of the plurality of ultrasonic generators 500-1 can be simultaneously driven based on a user's touch region. For example, two or more ultrasonic generators 500-1, which overlap the user's touch region or are disposed at a periphery of the user's touch region, of the plurality of ultrasonic generators 500-1 can be simultaneously driven, and thus, a uniform ultrasonic (or the haptic ultrasonic or the haptic texture ultrasonic or the low frequency haptic or the ultrasonic vibration) can be generated in the user's touch region and a periphery thereof, thereby continuously providing the user with a virtual texture which is seamless (or uninterrupted or disconnecting).

The display apparatus according to the third embodiment of the present disclosure can provide the same effect as that of the display apparatus according to the second embodiment of the present disclosure. Further, the display apparatus according to the third embodiment of the present disclosure can provide a user with a virtual texture in an entire region through the plurality of ultrasonic generators 500-1 without a dead zone, with respect to a surface of the display member 100.

Figure 10:
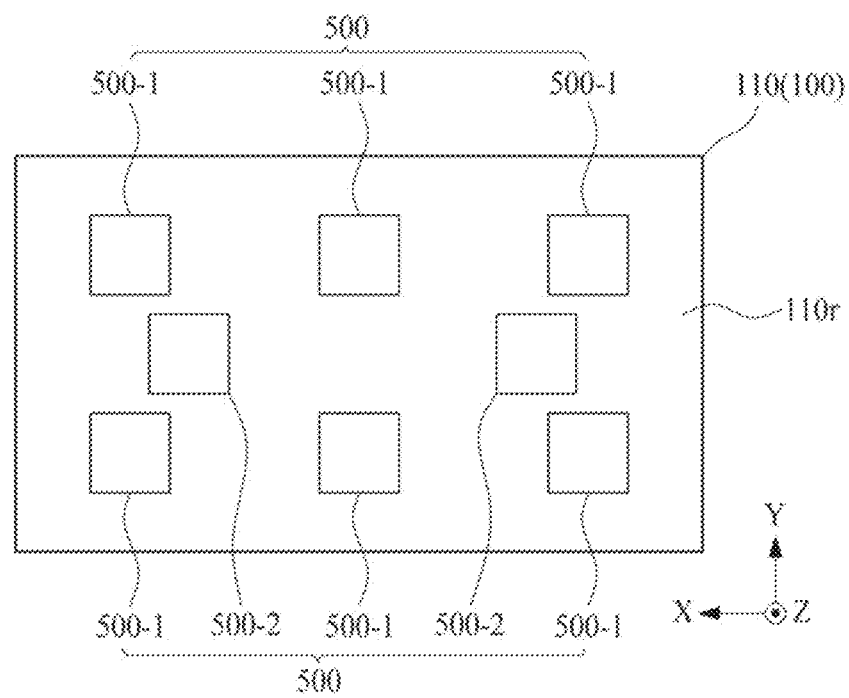
FIG. 10 illustrates a display apparatus according to another embodiment of the present disclosure.

FIG. 10 illustrates a display apparatus according to another embodiment (or a fourth embodiment) of the present disclosure. Here, FIG. 10 illustrates an embodiment implemented by modifying the vibration apparatus of the display apparatus according to the first to third embodiments of the present disclosure described above with reference to FIGS. 1 to 9. In the following descriptions, therefore, the other elements except a vibration apparatus are referred to by like reference numerals, and repeated descriptions thereof are omitted. The descriptions of the display apparatus according to the first to third embodiments of the present disclosure described above with reference to FIGS. 1 to 9 can be included in descriptions of a display apparatus according to the fourth embodiment of the present disclosure.

With reference to FIG. 10, in a display apparatus according to the fourth embodiment of the present disclosure, a vibration apparatus 500 can include a plurality of sound generators 500-2.

The plurality of sound generators 500-2 can be spaced apart from the plurality of ultrasonic generators 500-1 and can be disposed to be spaced apart from one another at or connected to a rear surface 110r of a display member 100. The plurality of sound generators 500-2 can be spaced apart from one another at or connected to the rear surface 110r of the display member 100. For example, the plurality of sound generators 500-2 can be disposed between the plurality of ultrasonic generators 500-1. For example, the plurality of sound generators 500-2 can be spaced apart from one another at or connected to the rear surface 110r of the display member 100 by a connection member.

According to an embodiment of the present disclosure, the vibration apparatus 500 can include first and second sound generators 500-2.

One sound generator of the first and second sound generators 500-2 can be disposed at a first rear region (or a first region or a left region) of the rear surface 110r of the display panel 110 and can be disposed between the ultrasonic generators 500-1 of the plurality of ultrasonic generators 500-1 at the first rear region. For example, one sound generator of the first and second sound generators 500-2 can be disposed at a center portion of the first rear region, or can be disposed to be spaced apart from the center portion of the first rear region.

The other sound generator of the first and second sound generators 500-2 can be disposed at a second rear region (or a second region or a right region) of the rear surface 110r of the display panel 110 and can be disposed between the ultrasonic generators 500-1 of plurality of ultrasonic generators 500-1 at the second rear region. For example, the other sound generator of the first and second sound generators 500-2 can be disposed at a center portion of the second rear region, or can be disposed to be spaced apart from the center portion of the second rear region.

The first and second sound generators 500-2 can be arranged (or disposed) in a horizontal symmetric structure or a horizontal asymmetric structure with respect to a center portion of the rear surface 110r of the display panel 110.

The display apparatus according to the fourth embodiment of the present disclosure can provide the same effect as that of the display apparatus according to first to third embodiments of the present disclosure. Further, the display apparatus according to a fourth embodiment of the present disclosure can output a sound, generated based on a vibration of the display member 100 based on a vibration of each of the plurality of sound generators 500-2, in a forward direction FD of the display member 100.

Figure 11:
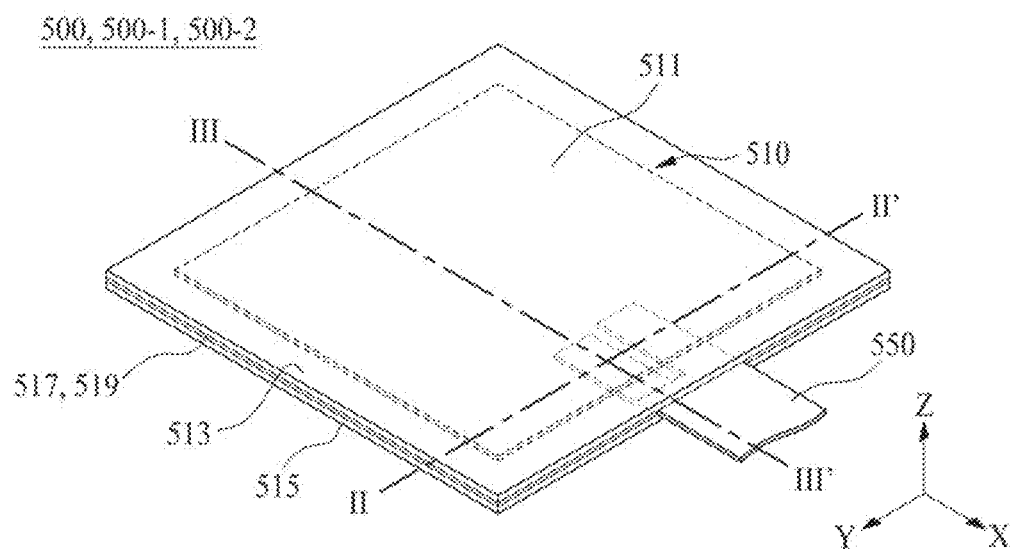
FIG. 11 illustrates a vibration apparatus according to an embodiment of the present disclosure.
Figure 12:
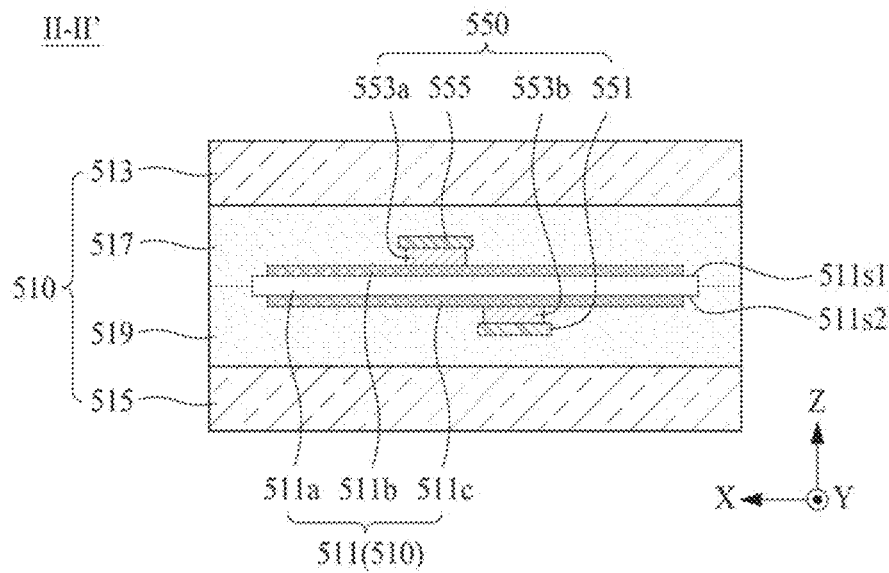
FIG. 12 is a cross-sectional view of a vibration apparatus taken along line II-II' in FIG. 11 according to an embodiment of the present disclosure.
Figure 13:
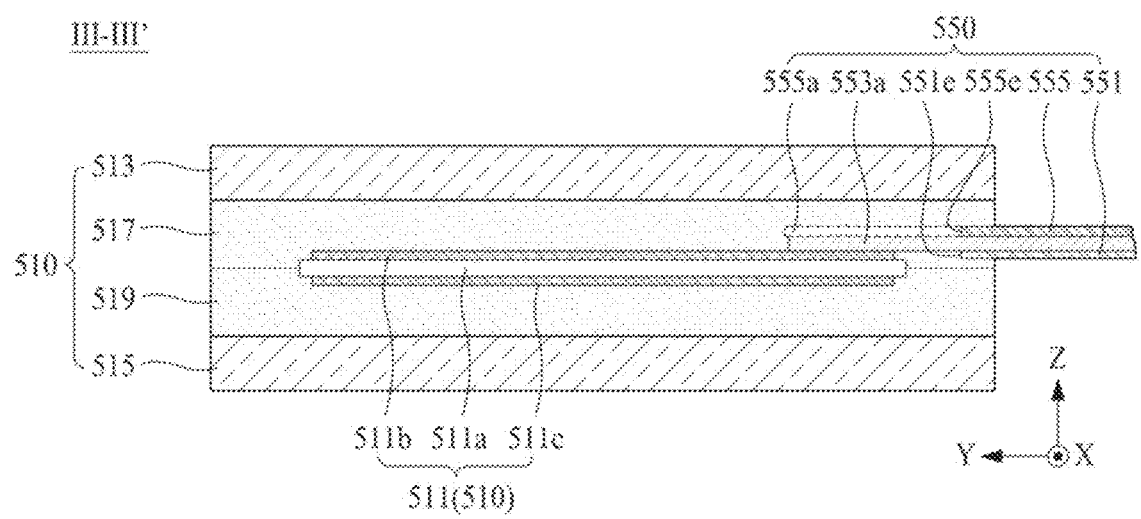
FIG. 13 is another cross-sectional view of a vibration apparatus taken along line III-III' in FIG. 11 according to an embodiment of the present disclosure.

FIG. 11 illustrates a vibration apparatus according to an embodiment of the present disclosure. FIG. 12 is a cross-sectional view of a vibration apparatus taken along line II-II' in FIG. 11 according to an embodiment of the present disclosure. FIG. 13 is another cross-sectional view of a vibration apparatus taken along line III-III' in FIG. 11 according to an embodiment of the present disclosure. Here, FIGS. 11 to 13 illustrate the vibration apparatus described above with reference to FIGS. 1 to 8, the plurality of ultrasonic generators described above with reference to FIG. 9, and the plurality of sound generators described above with reference to FIG. 10.

With reference to FIGS. 11 to 13, each of a vibration apparatus 500, a plurality of ultrasonic generators 500-1, and a plurality of sound generators 500-2 according to an embodiment of the present disclosure can include a vibration device 510.

The vibration device 510 can include a piezoelectric material. The vibration device 510 of each of the vibration apparatus 500 or the plurality of ultrasonic generators 500-1 can be configured to vibrate based on the haptic driving signal supplied from the vibration driver described above with reference to FIG. 6 or 8. The vibration device 510 of each of the plurality of sound generators 500-2 can be configured to vibrate based on a vibration driving signal (or a sound signal or a voice signal) supplied from the vibration driver illustrated in FIG. 6 or 8. For example, the vibration device 510 can be a vibration generating device, a vibration film, a vibration generating film, a vibrator, a vibration generator, an active vibrator, an active vibration generator, or an active vibration member, but embodiments of the present disclosure are not limited thereto. In the following descriptions, a "driving signal" can be a haptic driving signal or a vibration driving signal.

The vibration device 510 according to an embodiment of the present disclosure can include a vibration part 511. The vibration part 511 can be configured to vibrate by a piezoelectric effect based on a driving signal. The vibration part 511 can include at least one or more of a piezoelectric inorganic material and a piezoelectric organic material. For example, the vibration part 511 can be a piezoelectric device, a piezoelectric device part, a piezoelectric device layer, a piezoelectric structure, a piezoelectric vibration part, or a piezoelectric vibration layer, but embodiments of the present disclosure are not limited thereto.

The vibration device 510 or the vibration part 511 according to an embodiment of the present disclosure can include a vibration layer 511a, a first electrode layer 511b, and a second electrode layer 511c.

The vibration layer 511a can include a piezoelectric material or an electroactive material which exhibits a piezoelectric effect. For example, the piezoelectric material can have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 511a can be a piezoelectric layer, a piezoelectric material layer, an electroactive layer, a piezoelectric composite layer, a piezoelectric composite, or a piezoelectric ceramic composite, or the like, but embodiments of the present disclosure are not limited thereto.

The vibration layer 511a can be configured as a ceramic-based material for implementing a relatively high vibration, or can be configured as a piezoelectric ceramic having a perovskite-based crystalline structure. The perovskite crystalline structure can have or exhibit a piezoelectric effect and/or an inverse piezoelectric effect and can be a plate-shaped structure having an orientation.

The piezoelectric ceramic can be configured as a single crystalline ceramic having a crystalline structure, or can be configured as a ceramic material having a polycrystalline structure or polycrystalline ceramic. A piezoelectric material of the single crystalline ceramic can include α-AlPO$_4$, α-SiO$_2$, LiNbO$_3$, Tb$_2$(MoO$_4$)$_3$, Li$_2$B$_4$O$_7$, or ZnO, but embodiments of the present disclosure are not limited thereto. A piezoelectric material of the polycrystalline ceramic can include a lead zirconate titanate (PZT)-based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration layer 511a can include at least one or more of calcium titanate (CaTiO$_3$), barium titanate (BaTiO$_3$), or strontium titanate (SrTiO$_3$), without lead (Pb), but embodiments of the present disclosure are not limited thereto.

The vibration layer 511a of each of the vibration apparatus 500 and the plurality of ultrasonic generators 500-1 can be configured to have a first thickness. The vibration layer 511a of each of the plurality of sound generators 500-2 can be configured to have a second thickness equal to or different from the first thickness. For example, the vibration layer 511a of each of the vibration apparatus 500 and the plurality of ultrasonic generators 500-1 can have the first thickness which is thicker than the second thickness of the vibration layer 511a of the sound generator 500-2 to generate the ultrasonic, but embodiments of the present disclosure are not limited thereto.

The first electrode layer 511b can be disposed at a first surface (or an upper surface or a front surface) 511s1 of the vibration layer 511a. The first electrode layer 511b can have the same size as that of the vibration layer 511a, or can have a size which is smaller than that of the vibration layer 511a.

The second electrode layer 511c can be disposed at a second surface (or a lower surface or a rear surface) 511s2 which is opposite to or different from the first surface 511s1 of the vibration layer 511a. The second electrode layer 511c can have the same size as that of the vibration layer 511a, or can have a size which is smaller than that of the vibration layer 511a. For example, the second electrode layer 511c can have a same shape as that of the vibration layer 511a, but embodiments of the present disclosure are not limited thereto.

According to an embodiment of the present disclosure, in order to prevent electrical short circuit between the first electrode layer 511b and the second electrode layer 511c, each of the first electrode layer 511b and the second electrode layer 511c can be formed at the other portion (or a central portion), but not at a periphery portion, of the vibration layer 511a. For example, the first electrode layer 511b can be formed at an entire first surface 511s1, other than an edge portion (or a periphery portion), of the vibration layer 511a. For example, the second electrode layer 511c can be formed at an entire second surface 511s2, other than the edge portion (or the periphery portion), of the vibration layer 511a. For example, a distance between a lateral surface (or a sidewall) of each of the first electrode layer 511b and the second electrode layer 511c and a lateral surface (or a sidewall) of the vibration layer 511a can be at least 0.5 mm or more. For example, the distance between the lateral surface of each of the first electrode layer 511b and the second electrode layer 511c and the lateral surface of the vibration layer 511a can be at least 1 mm or more, but embodiments of the present disclosure are not limited thereto.

One or more of the first electrode layer 511b and the second electrode layer 511c according to an embodiment of the present disclosure can be formed of a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include gold (Au), silver (Ag), platinum (Pt), palladium (Pd), molybdenum (Mo), magnesium (Mg), carbon, or silver (Ag) including glass frit, or the like, or can be made of an alloy thereof, but embodiments of the present disclosure are not limited thereto. For example, to enhance an electrical characteristic and/or a vibration characteristic of the vibration layer 511a, each of the first electrode layer 511b and the second electrode layer 511c can include silver (Ag) having a low resistivity. For example, carbon can be the carbon black, ketjen black, carbon nanotube, and a carbon material including graphite, but embodiments of the present disclosure are not limited thereto.

The vibration layer 511a can be polarized (or poling) by a certain voltage applied to the first electrode layer 511b and the second electrode layer 511c in a certain temperature atmosphere, or a temperature atmosphere that can be changed from a high temperature to a room temperature, but embodiments of the present disclosure are not limited thereto. For example, a polarization direction (or a poling direction) formed in the vibration layer 511a can be formed or aligned (or arranged) from the first electrode layer 511b to the second electrode layer 511c, but is not limited thereto, and a polarization direction (or a poling direction) formed in the vibration layer 511a can be formed or aligned (or arranged) from the second electrode layer 511c to the first electrode layer 511b.

The vibration layer 511a can alternately and repeatedly contract and/or expand based on an inverse piezoelectric effect according to a driving signal applied to the first electrode layer 511b and the second electrode layer 511c from the outside to vibrate. For example, the vibration layer 511a can vibrate in a vertical direction (or thickness direction) and in a planar direction in response to the signal applied to the first electrode layer 511b and the second electrode layer 511c. The vibration layer 511a can be displaced (or vibrated or driven) by contraction and/or expansion in the planar direction, thereby improving a sound characteristic and/or a sound pressure level characteristic of the vibration part 511.

The vibration apparatus 500, the plurality of ultrasonic generators 500-1, and the plurality of sound generators 500-2 according to an embodiment of the present disclosure can further include a first cover member 513 and a second cover member 515.

The first cover member 513 can be disposed at a first surface of the vibration part 511. For example, the first cover member 513 can be configured to cover the first electrode layer 511b of the vibration part 511. For example, the first cover member 513 can be configured to have a larger size than the vibration part 511. The first cover member 513 can be configured to protect the first surface of the vibration part 511 and the first electrode layer 511b.

The second cover member 515 can be disposed at a second surface of the vibration part 511. For example, the second cover member 515 can be configured to cover the second electrode layer 511c of the vibration part 511. For example, the second cover member 515 can be configured to have a larger size than the vibration part 511. The second cover member 515 can be configured to protect the second surface of the vibration part 511 and the second electrode layer 511c.

Each of the first cover member 513 and the second cover member 515 according to an embodiment of the present disclosure can include one or more materials of plastic, fiber, cloth, paper, leather, carbon, and wood, but embodiments of the present disclosure are not limited thereto. For example, each of the first cover member 513 and the second cover member 515 can include the same material or different material. For example, each of the first cover member 513 and the second cover member 515 can be a polyimide film or a polyethylene terephthalate film, but embodiments of the present disclosure are not limited thereto.

Each of the first cover member 513 and the second cover member 515 according to an embodiment of the present disclosure can include one or more adhesive member. For example, one or more of the first cover member 513 and the second cover member 515 can include an adhesive member which is coupled to or attached on the vibration part 511 and a protection member (or a stripping member) which covers or protects the adhesive member. For example, the adhesive member can include an electrical insulation material which has adhesive properties and is capable of compression and decompression. For example, the first cover member 513 can include an adhesive member which is coupled to or attached on the vibration part 511 and a protection member (or a stripping member or a delamination member) which covers or protects the adhesive member.

The first cover member 513 can be connected or coupled to the first surface of the vibration part 511 or the first electrode layer 511b by a first adhesive layer 517. For example, the first cover member 513 can be connected or coupled to the first surface of the vibration part 511 or the first electrode layer 511b by a film laminating process by the first adhesive layer 517.

The second cover member 515 can be connected or coupled to the second surface of the vibration part 511 or the second electrode layer 511c by a second adhesive layer 519. For example, the second cover member 515 can be connected or coupled to the second surface of the vibration part 511 or the second electrode layer 511c by a film laminating process by the second adhesive layer 519.

Each of the first adhesive layer 517 and second adhesive layer 519 according to an embodiment of the present disclosure can include an electrically insulating material which has adhesiveness and is capable of compression and decompression. For example, each of the first adhesive layer 517 and the second adhesive layer 519 can include an epoxy resin, an acrylic resin, a silicone resin, or a urethane resin, but embodiments of the present disclosure are not limited thereto.

The first adhesive layer 517 and second adhesive layer 519 can be configured between the first cover member 513 and the second cover member 515 to surround the vibration part 511. For example, one or more of the first adhesive layer 517 and second adhesive layer 519 can be configured to surround the vibration part 511.

Each of the vibration apparatus 500, the plurality of ultrasonic generators 500-1, and the plurality of sound generators 500-2 according to an embodiment of the present disclosure can further include a signal supply member 550.

The signal supply member 550 can be configured to supply the driving signal supplied from a driving circuit part to the vibration device 510. The signal supply member 550 can be configured to be electrically connected to the vibration device 510 at one side (or one portion) of the vibration device 510. The signal supply member 550 can be configured to be electrically connected to the first electrode layer 511b and the second electrode layer 511c of the vibration part 511.

A portion of the signal supply member 550 can be accommodated (or inserted) between the first cover member 513 and the second cover member 515. An end portion (or a distal end portion) of the signal supply member 550 can be disposed or inserted (or accommodated) between one edge portion (or a periphery portion) of the first cover member 513 and one edge portion (or a periphery portion) of the second cover member 515. The one edge portion of the first cover member 513 and the one edge portion of the second cover member 515 can accommodate or vertically cover the end portion (or the distal end portion or one side) of the signal supply member 550. Accordingly, the signal supply member 550 can be provided (or integrated) as one body with the vibration device 510. For example, the signal supply member 550 can be configured as a signal cable, a flexible cable, a flexible printed circuit cable, a flexible flat cable, a single-sided flexible printed circuit, a single-sided flexible printed circuit board, a flexible multilayer printed circuit, or a flexible multilayer printed circuit board, but embodiments of the present disclosure are not limited thereto.

The signal supply member 550 according to an embodiment of the present disclosure can include a base member 551 and a plurality of signal lines 553a and 553b. For example, the signal supply member 550 can include a base member 551, a first signal line 553a, and a second signal line 553b.

The base member 551 can include a transparent or opaque plastic material, but embodiments of the present disclosure are not limited thereto. The base member 551 can have a certain width along a first direction X and can be extended long (or lengthwise) along a second direction Y intersecting with the first direction X.

The first and second signal lines 553a and 553b can be disposed at the first surface of the base member 551 in parallel with the second direction Y, and can be spaced apart from each other or electrically separated from each other in the first direction X. The first and second signal lines 553a and 553b can be disposed in parallel to each other at the first surface of the base member 551. For example, the first and second signal lines 553a and 553b can be implemented in a line shape by patterning of a metal layer (or a conductive layer) formed or deposited at the first surface of the base member 551.

End portions (or distal end portions or one sides) of the first and second signal lines 553a and 553b can be separated from each other, and thus, can be individually curved or bent.

The end portion (or the distal end portion or the one side or the one portion) of the first signal line 553a can be electrically connected to the first electrode layer 511b of the vibration part 511. For example, the end portion of the first signal line 553a can be electrically connected to at least a portion of the first electrode layer 511b of the vibration part 511 at one edge portion (or one periphery portion) of the first cover member 513. For example, the end portion (or the distal end portion or the one side) of the first signal line 553a can be electrically and directly connected to the first electrode layer 511b of the vibration part 511. For example, the end portion (or the distal end portion or the one side) of the first signal line 553a can be electrically connected to or directly contact the first electrode layer 511b of the vibration part 511. For example, the end portion of the first signal line 553a can be electrically connected to the first electrode layer 511b by a conductive double-sided tape. Accordingly, the first signal line 553a can transfer a first driving signal, supplied from a vibration driver, to the first electrode layer 511b of the vibration part 511.

The end portion (or the distal end portion or the one side or the one portion) of the second signal line 553b can be electrically connected to the second electrode layer 511c of the vibration part 511. For example, the end portion of the second signal line 553b can be electrically connected to at least a portion of the second electrode layer 511c of the vibration part 511 at one edge portion (or one periphery portion) of the second cover member 515. For example, the end portion of the second signal line 553b can be electrically and directly connected to at least a portion of the second electrode layer 511c of the vibration part 511. For example, the end portion of the second signal line 553b can be electrically connected to or directly contact the second electrode layer 511c of the vibration part 511. For example, the end portion of the second signal line 553b can be electrically connected to the second electrode layer 511c by a conductive double-sided tape. Accordingly, the second signal line 553b can transfer a second driving signal, supplied from the vibration driver, to the second electrode layer 511c of the vibration part 511.

The signal supply member 550 according to an embodiment of the present disclosure can further include an insulation layer 555.

The insulation layer 555 can be disposed at the first surface of the base member 551 to cover each of the first signal line 553a and the second signal line 553b other than the end portion (or one side or one portion) of the signal supply member 550.

An end portion (or one side or one portion) of the signal supply member 550 including an end portion (or one side or one portion) of the base member 551 and an end portion (or one side or one portion) 555a of the insulation layer 555 can be inserted (or accommodated) between the first surface of the vibration part 511 and the first cover member 513 and can be inserted or fixed between the first surface of the vibration part 511 and the first cover member 513 by the first adhesive layer 517. For example, the end portion (or one side or one portion) of the signal supply member 550 which is inserted (or accommodated) between the first surface of the vibration part 511 and the first cover member 513 can be inserted (or accommodated) or fixed between the first surface of the vibration part 511 and the first cover member 513 by a film laminating process using the first adhesive layer 517 and/or the second adhesive layer 519. Accordingly, the end portion (or one side or one portion) of the first signal line 553a can be maintained with being electrically connected to the first electrode layer 511b of the vibration part 511, and the end portion (or one side) of the second signal line 553b can be maintained with being electrically connected to the second electrode layer 511c of the vibration part 511. Further, the end portion (or one side or one portion) of the signal supply member 550 can be inserted (or accommodated) and fixed between the vibration part 511 and the first cover member 513, and thus, a contact defect (or bad connection) between the vibration device 510 and the signal supply member 550 caused by the movement of the signal supply member 550 can be prevented.

In the signal supply member 550 according to an embodiment of the present disclosure, each of the end portion (or one side or one portion) of the base member 551 and an end portion (or one side or one portion) 555a of the insulation layer 555 can be removed. For example, each of the end portion of the first signal line 553a and the end portion of the second signal line 553b can be exposed at the outside without being supported or covered by each of the end portion (or the one side or one portion) of the base member 551 and the end portion (or the one side or the one portion) 555a of the insulation layer 555. For example, the end portion of each of the first and second signal lines 553a and 553b can protrude (or extend) to have a certain length from an end 551e of the base member 551 or an end 555e of the insulation layer 555. Accordingly, each of the end portion (or the distal end portion or the one side or the one portion) of each of the first and second signal lines 553a and 553b can be individually or independently curved (or bent).

The end portion (or the one side) of the first signal line 553a, which is not supported by the end portion (or the one side) of the base member 551 and the end portion 555a of the insulation layer 555, can be directly connected to or directly contact the first electrode layer 511b of the vibration part 511. The end of the second signal line 553b, which is not supported by the end portion (or the one side) of the base member 551 and the end portion (or the one side) 555a of the insulation layer 555, can be directly connected to or directly contact the second electrode layer 511c of the vibration part 511.

According to an embodiment of the present disclosure, a portion of the signal supply member 550 (or a portion of the base member 551) can be disposed or inserted (or accommodated) between the first cover member 513 and the second cover member 515, and thus, the signal supply member 550 can be provided (or integrated) as one body with the vibration device 510. Accordingly, the vibration device 510 and the signal supply member 550 can be provided as one part (or one component), and thus, an effect of uni-materialization can be obtained.

According to an embodiment of the present disclosure, the first signal line 553a and the second signal line 553b of the signal supply member 550 can be provided (or integrated) as one body with the vibration device 510, and thus, a soldering process for an electrical connection between the vibration device 510 and the signal supply member 550 may not be needed. Accordingly, a manufacturing process and a structure of the vibration apparatus 500 can be simplified, and thus, a hazardous process can be reduced.

Figure 14:
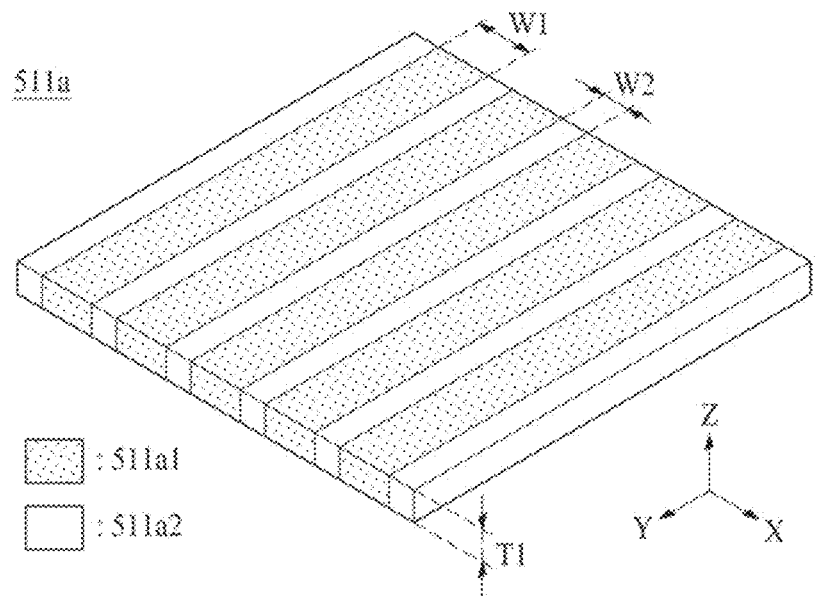
FIG. 14 illustrates an example of a vibration layer according to an embodiment of the present disclosure.

FIG. 14 illustrates a vibration layer according to another embodiment of the present disclosure, and illustrates another example of the vibration layer described above with reference to FIGS. 11 to 13.

With reference to FIGS. 12 and 14, the vibration layer 511a according to another embodiment of the present disclosure can include a plurality of first portions 511a1 and a plurality of second portions 511a2. For example, the plurality of first portions 511a1 and the plurality of second portions 511a2 can be alternately and repeatedly disposed along a first direction X (or a second direction Y). For example, the first direction X can be a widthwise direction (or a horizontal direction) of the vibration layer 511a, and the second direction Y can be a lengthwise direction (or a vertical direction) of the vibration layer 511a intersecting with the first direction X, but embodiments of the present disclosure are not limited thereto. For example, the first direction X can be a lengthwise direction of the vibration layer 511a, and the second direction Y can be a widthwise direction (or a horizontal direction) of the vibration layer 511a.

Each of the plurality of first portions 511a1 can include an inorganic material exhibiting or having a piezoelectric effect (or a piezoelectric characteristic). For example, each of the plurality of first portions 511a1 can include at least one or more of a piezoelectric inorganic material and a piezoelectric organic material. For example, each of the plurality of first portions 511a1 can be an inorganic portion, an inorganic material portion, a piezoelectric portion, a piezoelectric material portion, or an electroactive portion, but embodiments of the present disclosure are not limited thereto.

According to an embodiment of the present disclosure, each of the plurality of first portions 511a1 can have a first width W1 parallel to the first direction X and can be extended along the second direction Y intersecting with the first direction X. Each of the plurality of first portions 511a1 can include a material which can be substantially the same as the vibration layer 511a described above with reference to FIGS. 11 to 13, and thus, repeated descriptions thereof are omitted or briefly discussed.

Each of the plurality of first portions 511a1 which is in each of the vibration apparatus 500 and the plurality of ultrasonic generators 500-1 can be configured to have a first thickness. Each of the plurality of first portions 511a1 which is in each of the plurality of sound generators 500-2 can be configured to have a second thickness equal to or different from the first thickness. For example, each of the plurality of first portions 511a1 which is in each of the vibration apparatus 500 and the plurality of ultrasonic generators 500-1 can have the first thickness which is thicker than the second thickness of each of the plurality of first portions 511a1 which is in each of the plurality of sound generator 500-2 to generate the ultrasonic, but embodiments of the present disclosure are not limited thereto.

Each of the plurality of second portions 511a2 can be disposed between the plurality of first portions 511a1. For example, each of the plurality of first portions 511a1 can be disposed between two adjacent second portions 511a2 of the plurality of second portions 511a2. Each of the plurality of second portions 511a2 can have a second width W2 parallel to the first direction X (or the second direction Y) and can be extended along the second direction Y (or the first direction X). The first width W1 can be the same as or different from the second width W2. For example, the first width W1 can be greater than the second width W2. For example, the first portion 511a1 and the second portion 511a2 can include a line shape or a stripe shape which has the same size or different sizes.

Each of the plurality of second portions 511a2 can be configured to fill a gap between two adjacent first portions 511a1 of the plurality of first portions 511a1. Each of the plurality of second portions 511a2 can be configured to fill a gap between two adjacent first portions 511a1 of the plurality of first portions 511a1, and thus, can be connected to or attached on lateral surfaces of the first portion 511a1 adjacent thereto. According to an embodiment of the present disclosure, each of the plurality of first portions 511a1 and the plurality of second portions 511a2 can be disposed (or arranged) at the same plane (or the same layer) in parallel with each other. Therefore, the vibration layer 511a can be expanded to a desired size or length by a lateral coupling (or connection) of the first portion 511a1 and the second portion 511a2.

According to an embodiment of the present disclosure, each of the plurality of second portions 511a2 can absorb an impact applied to the first portions 511a1, and thus, can enhance the durability of the first portions 511a1 and provide flexibility to the vibration layer 511a. Each of the plurality of second portions 511a2 can include an organic material having a ductile characteristic. For example, each of the plurality of second portions 511a2 can include one or more of an epoxy-based polymer, an acrylic-based polymer, and a silicone-based polymer, but embodiments of the present disclosure are not limited thereto. For example, each of the plurality of second portions 511a2 can be an organic portion, an organic material portion, an adhesive portion, a stretch portion, a bending portion, a damping portion, or a ductile portion, but embodiments of the present disclosure are not limited thereto.

A first surface of each of the plurality of first portions 511a1 and the plurality of second portions 511a2 can be connected to the first electrode layer 511b in common. A second surface of each of the plurality of first portions 511a1 and the plurality of second portions 511a2 can be connected to the second electrode layer 511c in common.

The plurality of first portions 511a1 and the plurality of second portion 511a2 can be disposed on (or connected to) the same plane, and thus, the vibration layer 511a according to another embodiment of the present disclosure can have a single thin film-type. Accordingly, the vibration part 511 or the vibration device 510 including the vibration layer 511a according to another embodiment of the present disclosure can vibrate in vertically (or up and down) direction by the first portion 511a1 having a vibration characteristic and can be bent in a curved shape by the second portion 511a2 having flexibility.

Figure 15:
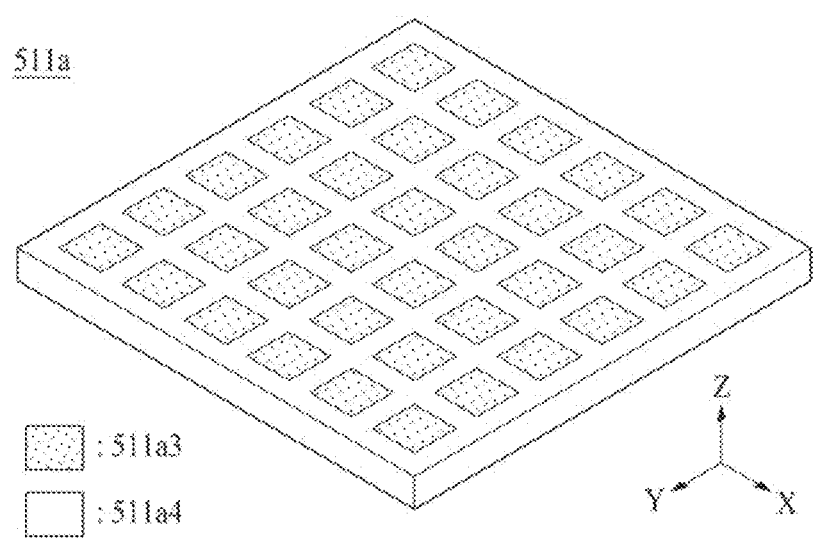
FIG. 15 illustrates another example of a vibration layer according to an embodiment of the present disclosure.

FIG. 15 illustrates a vibration layer according to another embodiment of the present disclosure, and illustrates another example of the vibration layer described above with reference to FIGS. 11 to 13.

With reference to FIGS. 12 and 15, the vibration layer 511a according to another embodiment of the present disclosure can include a plurality of first portions 511a3 and a second portion 511a4 disposed between the plurality of first portions 511a3.

Each of the plurality of first portions 511a3 can be disposed to be spaced apart from one another along each of the first direction X and the second direction Y. For example, each of the plurality of first portions 511a3 can have a hexahedral shape having the same size and can be disposed in a lattice shape, but embodiments of the present disclosure are not limited thereto. For example, each of the plurality of first portions 511a3 can have a square shape plate, a circular shape plate, an oval shape plate, or a polygonal shape plate, which have the same size as each other, but embodiments of the present disclosure are not limited thereto.

Each of the plurality of first portions 511a3 can include a material which can be substantially the same as the first portion 511a1 described above with reference to FIG. 14, and thus, repeated descriptions thereof are omitted.

The second portion 511a4 can be disposed between the plurality of first portions 511a3 along each of the first direction X and the second direction Y. The second portion 511a4 can be configured to fill a gap between two adjacent first portions 511a3 or to surround each of the plurality of first portions 511a3, and thus, the second portion 511a4 can be connected to or attached on the first portion 511a3 adjacent thereto. The second portion 511a4 can include a material which is be substantially the same as the second portion 511a2 described above with reference to FIG. 14, and thus, repeated descriptions thereof are omitted.

A first surface of each of the plurality of first portions 511a3 and the second portions 511a4 can be connected to the first electrode layer 511b in common. A second surface of each of the plurality of first portions 511a3 and the second portions 511a4 can be connected to the second electrode layer 511c in common.

The plurality of first portions 511a3 and the second portion 511a4 can be disposed on (or connected to) the same plane, and thus, the vibration layer 511a according to another embodiment of the present disclosure can have a single thin film-type. Accordingly, the vibration part 511 or the vibration device 510 including the vibration layer 511a according to another embodiment of the present disclosure can vibrate in vertically (or up and down) direction by the first portion 511a3 having a vibration characteristic and can be bent in a curved shape by the second portion 511a4 having flexibility.

Figure 16:
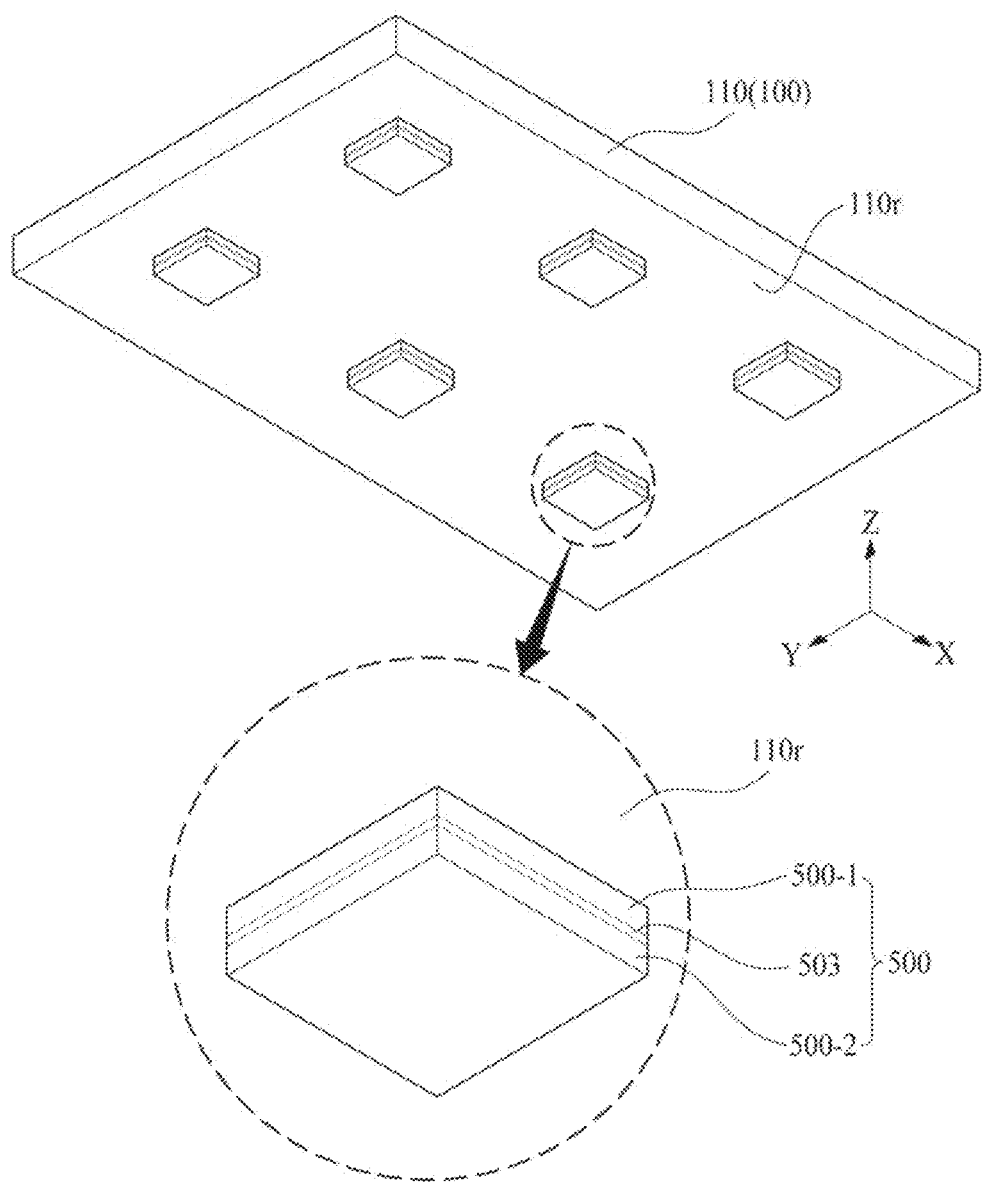
FIG. 16 illustrates a display apparatus according to another embodiment of the present disclosure.
Figure 17:
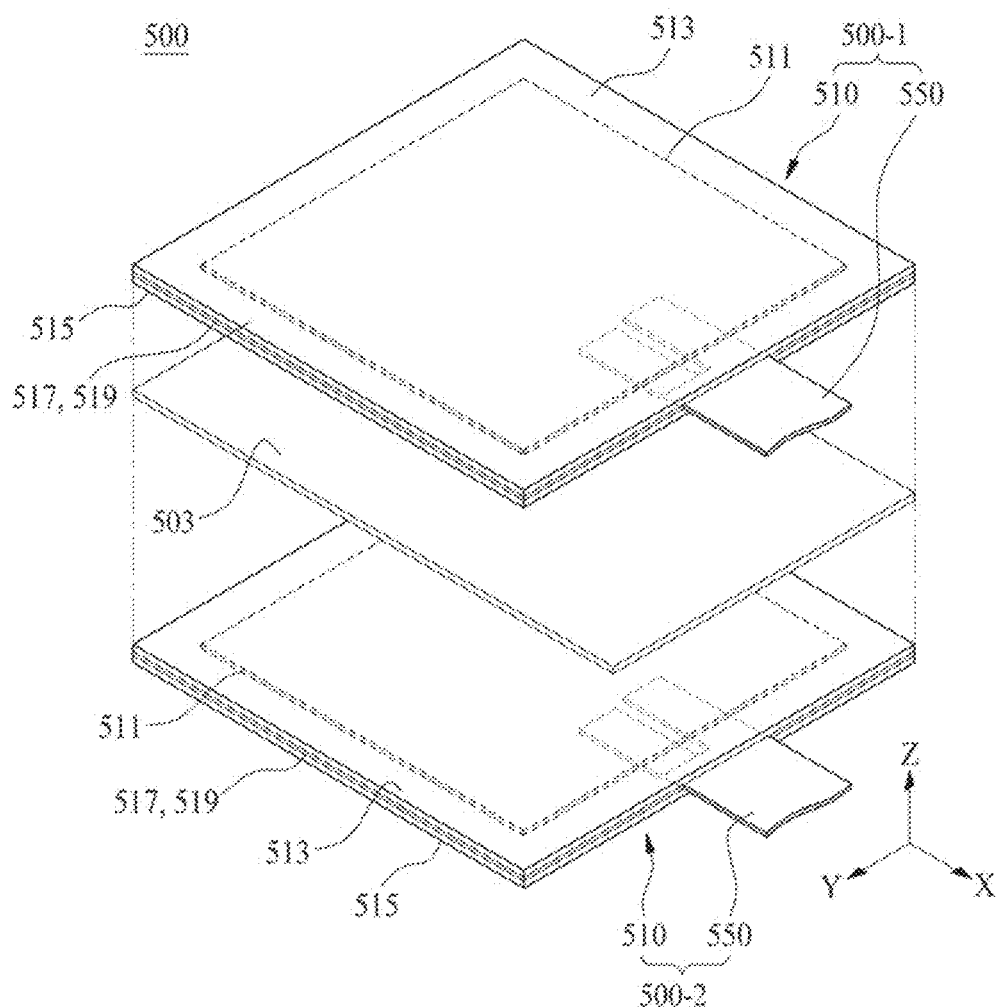
FIG. 17 illustrates another example of a vibration apparatus in the display apparatus illustrated in FIG. 16 according to an embodiment of the present disclosure.

FIG. 16 illustrates a display apparatus according to another embodiment (or a fifth embodiment) of the present disclosure. FIG. 17 illustrates an example of a vibration apparatus in the display apparatus illustrated in FIG. 16. Particularly, FIGS. 16 and 17 illustrate an embodiment implemented by modifying the vibration apparatus of the display apparatus according to the first and second embodiments of the present disclosure described above with reference to FIGS. 1 to 8. In the following descriptions, therefore, the other elements except a vibration apparatus are referred to by like reference numerals, and repeated descriptions thereof are omitted or briefly provided. The descriptions of the display apparatus according to the first and second embodiment of the present disclosure described above with reference to FIGS. 1 to 8 can be included in descriptions of a display apparatus according to a fifth embodiment of the present disclosure.

With reference to FIGS. 16 and 17, in a display apparatus according to the fifth embodiment of the present disclosure, a vibration apparatus 500 can include a plurality of ultrasonic generators 500-1, a plurality of sound generators 500-2, and an adhesive member 503.

Each of the plurality of ultrasonic generators 500-1 can overlap or be stacked with a corresponding sound generator 500-2 of the plurality of sound generators 500-2.

According to an embodiment of the present disclosure, the plurality of ultrasonic generators 500-1 can be disposed to be spaced apart from one another at a rear surface 110r of a display panel 110 or connected to a rear surface 110r of a display panel 110. For example, the plurality of ultrasonic generators 500-1 can be disposed to be spaced apart from one another at or connected to the rear surface 110r of the display panel 110 by a connection member 600 (see FIG. 2). Each of the plurality of sound generator 500-2 can be connected to or disposed at a rear surface of a corresponding ultrasonic generator 500-1 of the plurality of ultrasonic generators 500-1, and connected thereto by the adhesive member 503. For example, when the ultrasonic generator 500-1 is connected to the rear surface 110r of the display panel 110, the ultrasonic generator 500-1 can directly vibrate the display member 100, and thus, can easily generate an ultrasonic (or a haptic ultrasonic or a haptic texture ultrasonic or a low frequency haptic or an ultrasonic vibration) at a surface of the display member 100.

According to another embodiment of the present disclosure, the plurality of sound generators 500-2 can be disposed to be spaced apart from one another at or connected to the rear surface 110r of the display panel 110. For example, the plurality of sound generators 500-2 can be disposed to be spaced apart from one another at or connected to the rear surface 110r of the display panel 110 by the connection member 600 (see FIG. 2). Each of the plurality of ultrasonic generators 500-1 can be connected to or disposed at a rear surface of a corresponding sound generator 500-2 of the plurality of sound generators 500-2, and connected thereto by the adhesive member 503. For example, when the sound generator 500-2 is connected to the rear surface 110r of the display panel 110, the sound generator 500-2 can directly vibrate the display member 100, and thus, can easily increase a displacement width (or a vibration width or a driving width) of the display member 100. For example, when the sound generator 500-2 is not connected to the rear surface 110r of the display panel 110 and is connected to a rear surface of the ultrasonic generator 500-1 and the ultrasonic generator 500-1 has a relatively thick thickness, a vibration of the sound generator 500-2 can be lost in the ultrasonic generator 500-1, and thus, a vibration efficiency or a vibration characteristic of the sound generator 500-2 can be reduced.

One ultrasonic generator 500-1 and one sound generator 500-2 which overlap each other or are stacked with each other by an adhesive member 503 can comprise one vibration generating apparatus. Accordingly, the display apparatus or the vibration apparatus 500 according to the fifth embodiment of the present disclosure can include a plurality of vibration generating apparatuses which are disposed to be spaced apart from one another at or connected to the rear surface 110r of the display panel 110.

In each of the plurality of vibration generating apparatuses, the ultrasonic generator 500-1 and the sound generator 500-2 which overlap each other or are vertically stacked can be individually or simultaneously driven based on a driving signal supplied from a vibration driver. For example, each of the plurality of vibration generating apparatuses can vibrate the display member 100 based on driving of the ultrasonic generator 500-1 to generate a haptic sound (or a low frequency haptic sound) and/or to generate a virtual texture at a surface of the display member 100. For example, each of the plurality of vibration generating apparatuses can vibrate the display member 100 based on the driving of the sound generator 500-2 to output a sound in a forward direction FD of the display member 100. For example, each of the plurality of vibration generating apparatuses can vibrate the display member 100 based on the driving of the ultrasonic generator 500-1 to generate a haptic sound (or a low frequency haptic sound) and/or to generate a virtual texture at the surface of the display member 100, and simultaneously, can vibrate the display member 100 based on the driving of the sound generator 500-2 to output a sound in the forward direction FD of the display member 100.

According to another embodiment of the present disclosure, each of the plurality of ultrasonic generators 500-1 and the plurality of sound generators 500-2 can be simultaneously displaced (or vibrated or driven) in the same direction, based on the vibration driving signal. For example, when there is no user's touch applied to the display member 100, the driving circuit part can generate the vibration driving signal based on a sound source and can supply the vibration driving signal to each of the plurality of ultrasonic generators 500-1 and the plurality of sound generators 500-2. For example, the plurality of ultrasonic generators 500-1 can be driven to generate an ultrasonic (or a haptic ultrasonic or a haptic texture ultrasonic or a low frequency haptic or an ultrasonic vibration) in only a user's touch period and can be driven to generate a sound (or a haptic sound) in a period where there is no user's touch.

Each of the plurality of ultrasonic generators 500-1 and the plurality of sound generators 500-2 can include a vibration device 510 and a signal supply member 550. The vibration device 510 and the signal supply member 550 can be the same as or substantially the same as the vibration device 510 and the signal supply member 500 described above with reference to FIGS. 11 to 15, respectively, and are referred to by like reference numerals and repeated descriptions thereof are omitted.

A plurality of first portions in each of the plurality of ultrasonic generators 500-1 and a plurality of first portions in each of the plurality of sound generators 500-2 can have the same size. A plurality of second portions in each of the plurality of ultrasonic generators 500-1 and a plurality of second portions in each of the plurality of sound generators 500-2 can have the same size. The plurality of first portions in each of the plurality of ultrasonic generators 500-1 and the plurality of first portions in each of the plurality of sound generators 500-2 can substantially overlap or stack without being staggered. Therefore, the plurality of first portions in each of the plurality of ultrasonic generators 500-1 and the plurality of first portions in each of the plurality of sound generators 500-2 can have the same size and can be provided in a stack structure where the first portions overlap without being staggered and can be displaced (or vibrated or driven) in the same direction. In this case, when a sound is generated based on a vibration of each of the plurality of ultrasonic generators 500-1 and the plurality of sound generators 500-2, the amount of displacement or an amplitude displacement of the display member 100 can be maximized or increase, and thus, a sound characteristic and a sound pressure level characteristic of a low-pitched sound band can be enhanced.

The adhesive member 503 can be disposed or connected between the ultrasonic generator 500-1 and the sound generator 500-2, which are stacked or overlap vertically (or up and down). For example, the adhesive member 503 can be disposed or connected between a second cover member 515 of the ultrasonic generator 500-1 and a first cover member 513 of the sound generator 500-2.

The adhesive member 503 according to an embodiment of the present disclosure can include a foam pad, a double-sided tape, a double-sided foam tape, a double-sided foam pad, an adhesive, or the like, but embodiments of the present disclosure are not limited thereto. For example, an adhesive layer of the adhesive member 503 can include epoxy, acrylic, silicone, or urethane, but embodiments of the present disclosure are not limited thereto. The adhesive layer of the adhesive member 503 can include a urethane-based material (or substance) having relatively larger ductile characteristic relative to that of the acrylic-based material. Accordingly, the vibration loss caused by displacement interference between the ultrasonic generators 500-1 and the sound generators 500-2 which overlap each other or are vertically (or up and down) stacked can be minimized or reduced, or each of the ultrasonic generators 500-1 and the sound generators 500-2 can be freely displaced (or driven or vibrated).

Figure 18:
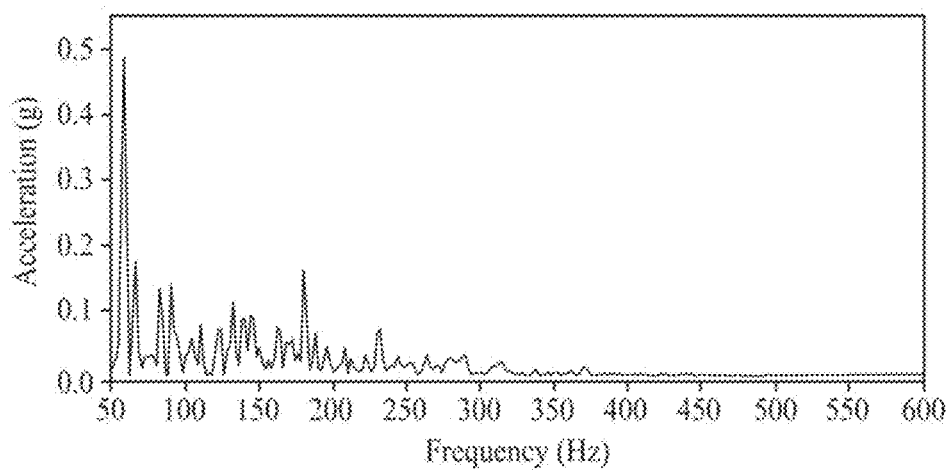
FIG. 18 is a graph illustrating an example of a result obtained by measuring a frequency-based vibration acceleration with respect to a virtual texture when a user pen touch is applied to a display apparatus according to an embodiment of the present disclosure.

FIG. 18 is a graph illustrating an example of a result obtained by measuring a frequency-based vibration acceleration with respect to a virtual texture when a user pen touch is applied to a display apparatus according to an embodiment of the present disclosure. In an experiment of FIG. 18, frequency-based intensity has been analyzed by performing fast Fourier transform (FFT) on an output signal of a vibration acceleration sensor disposed in a touch pen while vibrating a vibration apparatus based on a haptic driving signal and sliding (or drawing) the touch pen on a surface of a front member including a glass material.

In FIG. 18, it can be seen that an intensity of a frequency-based vibration acceleration based on a vibration of the touch pen which is slid (or drawn) on the surface of the front member including a glass material is similar to an intensity of a frequency-based vibration acceleration simulated, measured or determined for the actual texture object illustrated in FIG. 4A.

Therefore, in response to a user's touch, the display apparatus according to an embodiment of the present disclosure can vibrate a vibration apparatus based on the haptic driving signal to generate an ultrasonic (or a haptic ultrasonic or a haptic texture ultrasonic or a low frequency haptic or an ultrasonic vibration) at the surface of the display member, and thus, can provide a virtual texture (for example, a paper texture) instead of or different from a texture of the display member 100.

A display apparatus according to one or more embodiments of the present disclosure will be described below.

A display apparatus according to one or more embodiments of the present disclosure can comprise a display member including a plurality of pixels configured to display an image, and a vibration apparatus configured to vibrate the display member based on a haptic driving signal. The haptic driving signal can comprise a texture signal and an ultrasonic signal.

According to one or more embodiments of the present disclosure, the vibration apparatus can be configured to vibrate the display member to generate an ultrasonic vibration at a surface of the display member based on the haptic driving signal.

According to one or more embodiments of the present disclosure, the haptic driving signal can be generated by amplitude modulation of the ultrasonic signal based on the texture signal.

According to one or more embodiments of the present disclosure, the texture signal can comprise a plurality of low frequencies each in a frequency band of 50 Hz to 600 Hz.

According to one or more embodiments of the present disclosure, the texture signal can comprise a synthesis of the plurality of low frequencies.

According to one or more embodiments of the present disclosure, the texture signal can comprise a plurality of low frequencies among a frequency band of 50 Hz to 600 Hz.

According to one or more embodiments of the present disclosure, the haptic driving signal can comprise a plurality of peaks corresponding to a virtual texture in a frequency band of 50 Hz to 600 Hz.

According to one or more embodiments of the present disclosure, the haptic driving signal can comprise a plurality of low frequencies corresponding to a respective peak of a plurality of peaks, the plurality of peaks corresponding to a virtual texture in a frequency band of 50 Hz to 600 Hz.

According to one or more embodiments of the present disclosure, the vibration apparatus can comprise a vibration device, the vibration device can comprise a first cover member, a second cover member, and a vibration part between the first cover member and the second cover member and including a piezoelectric material.

According to one or more embodiments of the present disclosure, the vibration apparatus can comprise a plurality of ultrasonic generators configured to vibrate the display member based on the haptic driving signal. Each of the plurality of ultrasonic generators can include a piezoelectric material.

According to one or more embodiments of the present disclosure, the vibration apparatus can further comprise a vibration device, the vibration device can comprise a first cover member, a second cover member, and a vibration part between the first cover member and the second cover member and including a piezoelectric material.

According to one or more embodiments of the present disclosure, the vibration apparatus can further comprise a plurality of sound generators disposed between the plurality of ultrasonic generators and spaced apart from one another. Each of the plurality of sound generators can be configured to vibrate the display member based on the haptic driving signal or a vibration driving signal.

According to one or more embodiments of the present disclosure, each of the plurality of sound generators can comprise a vibration device including a piezoelectric material.

According to one or more embodiments of the present disclosure, the vibration apparatus can further comprise a plurality of sound generators vertically overlapping each of the plurality of ultrasonic generators, and an adhesive member disposed between one of the plurality of ultrasonic generators and one of the plurality of sound generators vertically overlapping each other. Each of the plurality of sound generators can comprise a vibration device including the piezoelectric material and is configured to vibrate the display member based on the haptic driving signal or a vibration driving signal.

According to one or more embodiments of the present disclosure, the vibration apparatus may further comprise a plurality of sound generators. Each of the plurality of sound generators may be configured to vibrate the display member based on the haptic driving signal or a vibration driving signal. The plurality of sound generators may be disposed between the plurality of ultrasonic generators and spaced apart from each other, or each of the plurality of sound generators vertically overlaps a respective ultrasonic generator of the plurality of ultrasonic generators with a respective adhesive member therebetween.

According to one or more embodiments of the present disclosure, the vibration part can include a plurality of first portions and one or more second portions between the plurality of first portions. Each of the plurality of first portions can include at least one or more of a piezoelectric inorganic material and a piezoelectric organic material. The one or more second portions can include an organic material.

According to one or more embodiments of the present disclosure, the vibration apparatus can further comprise a signal supply member electrically connected to the vibration part. A portion of the signal supply member can be accommodated between the first cover member and the second cover member.

According to one or more embodiments of the present disclosure, the texture signal may be based on texture information for a texture object one or more materials of paper, plastic, rubber, fabric, glass, wood, and metal.

According to one or more embodiments of the present disclosure, the texture information can be generated by measuring a frequency-based vibration acceleration of a vibration acceleration sensor on the texture object.

According to one or more embodiments of the present disclosure, the display apparatus can further comprise a driving circuit part electrically connected to the display member and the vibration apparatus. The driving circuit part can be configured to convert texture object-based haptic texture data, stored in a storage device, into the haptic driving signal and to supply the haptic driving signal to the vibration apparatus.

According to one or more embodiments of the present disclosure, the haptic texture data can comprise frequency information of the texture signal and frequency information for the ultrasonic signal.

According to one or more embodiments of the present disclosure, the haptic driving signal can comprise a haptic sound signal corresponding to a virtual texture.

According to one or more embodiments of the present disclosure, the haptic driving signal can comprise a synthesis of the haptic sound signal and an ultrasonic amplification signal generated by amplitude modulation of the ultrasonic signal based on the texture signal.

According to one or more embodiments of the present disclosure, the haptic texture data can include frequency information of the texture signal, frequency information of the ultrasonic signal, and frequency information for the haptic sound signal.

According to one or more embodiments of the present disclosure, the display member can further comprise a display panel including the plurality of pixels, and a touch panel connected to the display panel. The driving circuit part can be configured to detect a touch position of a user using the touch panel and to supply the haptic driving signal to the vibration apparatus.

According to one or more embodiments of the present disclosure, the driving circuit part can be configured to detect a finger touch of the user or a touch of a touch pen using the touch panel.

According to one or more embodiments of the present disclosure, the driving circuit part can comprise a vibration driver connected to the vibration apparatus. The vibration driver can be configured to convert one of the pieces of texture object-based haptic texture data into the haptic driving signal and to supply the haptic driving signal to the vibration apparatus.

According to one or more embodiments of the present disclosure, the display apparatus can further comprise a force sensing member connected to the display member. The driving circuit part can be configured to detect a touch strength of a user using the force sensing member and adjust an intensity of the haptic driving signal based on the touch strength.

According to one or more embodiments of the present disclosure, the force sensing member can include a piezoelectric device.

According to one or more embodiments of the present disclosure, the haptic driving signal can have a frequency of 20 kHz or more.

It will be apparent to those skilled in the art that various modifications and variations can be made in the present disclosure without departing from the scope of the disclosure. Thus, it is intended that the present disclosure covers the modifications and variations of this disclosure provided that within the scope of the claims and their equivalents.

What is claimed is:

1. A display apparatus, comprising:
    a display member including a plurality of pixels configured to display an image; and
    a vibration apparatus configured to vibrate the display member based on a haptic driving signal,
    wherein the haptic driving signal comprises a texture signal and an ultrasonic signal, and
    wherein the haptic driving signal is generated by an amplitude modulation of the ultrasonic signal based on the texture signal.

2. The display apparatus of claim 1, wherein the vibration apparatus is configured to vibrate the display member to generate an ultrasonic vibration at a surface of the display member based on the haptic driving signal.

3. The display apparatus of claim 1, wherein the texture signal comprises a plurality of low frequencies each in a frequency band of 50 Hz to 600 Hz.

4. The display apparatus of claim 3, wherein the texture signal comprises a synthesis of the plurality of low frequencies.

5. The display apparatus of claim 1, wherein the texture signal comprises a plurality of low frequencies among a frequency band of about 50 Hz to 600 Hz.

6. The display apparatus of claim 1, wherein the haptic driving signal comprises a plurality of peaks corresponding to a virtual texture in a frequency band of about 50 Hz to 600 Hz.

7. The display apparatus of claim 1, wherein the haptic driving signal comprises a plurality of low frequencies corresponding to a respective peak of a plurality of peaks, the plurality of peaks corresponding to a virtual texture in a frequency band of 50 Hz to 600 Hz.

8. The display apparatus of claim 1, wherein the vibration apparatus comprises a vibration device,
    wherein the vibration device comprises:
        a first cover member;
        a second cover member; and
        a vibration part between the first cover member and the second cover member and including a piezoelectric material.

9. The display apparatus of claim 1, wherein the vibration apparatus comprises a plurality of ultrasonic generators configured to vibrate the display member based on the haptic driving signal, and
    wherein each of the plurality of ultrasonic generators includes a piezoelectric material.

10. The display apparatus of claim 9, wherein the vibration apparatus further comprises a vibration device,
    wherein the vibration device comprises:
        a first cover member;
        a second cover member; and
        a vibration part between the first cover member and the second cover member and including a piezoelectric material.

11. The display apparatus of claim 9, wherein the vibration apparatus further comprises a plurality of sound generators disposed between the plurality of ultrasonic generators and spaced apart from one another, and
    wherein each of the plurality of sound generators is configured to vibrate the display member based on the haptic driving signal or a vibration driving signal.

12. The display apparatus of claim 11, wherein each of the plurality of sound generators comprises a vibration device including a piezoelectric material.

13. The display apparatus of claim 9, wherein the vibration apparatus further comprises:
    a plurality of sound generators vertically overlapping the plurality of ultrasonic generators; and
    an adhesive member disposed between one of the plurality of ultrasonic generators and one of the plurality of sound generators vertically overlapping each other, and
    wherein each of the plurality of sound generators comprises a vibration device including the piezoelectric material and is configured to vibrate the display member, based on the haptic driving signal or a vibration driving signal.

14. The display apparatus of claim 9, wherein the vibration apparatus further comprises:
    a plurality of sound generators vertically disposed between the plurality of ultrasonic generators and spaced apart from each other,
    wherein each of the plurality of sound generators vertically overlaps a respective ultrasonic generator of the plurality of ultrasonic generators with a respective adhesive member therebetween, and
    wherein each of the plurality of sound generators comprises a vibration device including the piezoelectric material and is configured to vibrate the display member, based on the haptic driving signal or a vibration driving signal.

15. The display apparatus of claim 8,
wherein the vibration part includes a plurality of first portions and one or more second portions disposed between the plurality of first portions,
wherein each of the plurality of first portions includes at least one of a piezoelectric inorganic material and a piezoelectric organic material, and
wherein the one or more second portions include an organic material.

16. The display apparatus of claim 8, wherein the vibration apparatus further comprises a signal supply member electrically connected to the vibration part, and
wherein a portion of the signal supply member is accommodated between the first cover member and the second cover member.

17. The display apparatus of claim 1, wherein the texture signal is based on texture information for a texture object comprising one or more materials of paper, plastic, rubber, fabric, glass, wood, or metal.

18. The display apparatus of claim 17, wherein the texture information is generated by measuring a frequency-based vibration acceleration of a vibration acceleration sensor on the texture object.

19. The display apparatus of claim 1, further comprising a driving circuit part electrically connected to the display member and the vibration apparatus,
wherein the driving circuit part is configured to convert texture object-based haptic texture data, stored in a storage device, into the haptic driving signal and to supply the haptic driving signal to the vibration apparatus.

20. The display apparatus of claim 19, wherein the haptic texture data comprises frequency information of the texture signal and frequency information for the ultrasonic signal.

21. The display apparatus of claim 19, wherein the haptic driving signal comprises a haptic sound signal corresponding to a virtual texture.

22. The display apparatus of claim 21, wherein the haptic driving signal comprises a synthesis of the haptic sound signal and an ultrasonic amplification signal generated by the amplitude modulation of the ultrasonic signal based on the texture signal.

23. The display apparatus of claim 22, wherein the haptic texture data includes frequency information for the texture signal, frequency information for the ultrasonic signal, and frequency information for the haptic sound signal.

24. The display apparatus of claim 19, wherein the display member further comprises:
a display panel including the plurality of pixels; and
a touch panel connected to the display panel,
wherein the driving circuit part is configured to detect a touch position of a user using the touch panel and to supply the haptic driving signal to the vibration apparatus.

25. The display apparatus of claim 24, wherein the driving circuit part configured to detect a finger touch of the user or a touch of a touch pen using the touch panel.

26. The display apparatus of claim 25, wherein the driving circuit part comprises a vibration driver connected to the vibration apparatus, and
wherein the vibration driver is configured to convert the texture object-based haptic texture data into the haptic driving signal and to supply the haptic driving signal to the vibration apparatus.

27. The display apparatus of claim 19, further comprising a force sensing member connected to the display member,
wherein the driving circuit part is configured to detect a touch strength of a user using the force sensing member and to adjust an intensity of the haptic driving signal based on the touch strength.

28. The display apparatus of claim 27, wherein the force sensing member includes a piezoelectric device.

29. The display apparatus of claim 1, wherein the haptic driving signal has a frequency of 20 kHz or more.

* * * * *